(12) United States Patent
Abraham et al.

(10) Patent No.: US 8,363,597 B2
(45) Date of Patent: Jan. 29, 2013

(54) MAC ARCHITECTURES FOR WIRELESS COMMUNICATIONS USING MULTIPLE PHYSICAL LAYERS

(75) Inventors: Santosh P. Abraham, San Diego, CA (US); Vered Bar Bracha, Hod Hasharon, IL (US); Hemanth Sampath, San Diego, CA (US); Vinay Sridhara, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 379 days.

(21) Appl. No.: 12/756,343

(22) Filed: Apr. 8, 2010

(65) Prior Publication Data

US 2010/0278062 A1  Nov. 4, 2010

Related U.S. Application Data

(60) Provisional application No. 61/168,207, filed on Apr. 9, 2009.

(51) Int. Cl.
*H04W 4/00* (2009.01)
*G06F 15/173* (2006.01)

(52) U.S. Cl. ........................................ 370/328; 709/223
(58) Field of Classification Search .................. None
See application file for complete search history.

(56) References Cited

U.S. PATENT DOCUMENTS

| | | | |
|---|---|---|---|
| 2002/0194500 A1 | 12/2002 | Bajikar | |
| 2004/0199686 A1* | 10/2004 | Karaoguz | 710/72 |
| 2005/0091389 A1 | 4/2005 | Qi et al. | |
| 2007/0053351 A1 | 3/2007 | Kalogridis | |
| 2007/0238413 A1 | 10/2007 | Coutts | |
| 2008/0318630 A1 | 12/2008 | Gil | |
| 2011/0090880 A1 | 4/2011 | Abraham et al. | |

FOREIGN PATENT DOCUMENTS

| | | |
|---|---|---|
| EP | 1465372 | 10/2004 |
| EP | 1509000 | 2/2005 |
| WO | WO2005076535 | 8/2005 |
| WO | WO2008075316 A2 | 6/2008 |

OTHER PUBLICATIONS

"IEEE Standard for Local and Metropolitan Area Networks Part 21: Media Independent Handover; IEEE Std 802.21/2008" IEEE Standard, IEEE, Piscataway, NJ, Jan. 21, 2009, pp. CI-301, XP017604180 ISBN: 978-0-7381-5830-3.
International Search Report and Written Opinion—PCT/US2010/030605-ISA/EPO—Jul. 16, 2010.
International Search Report and Written Opinion—PCDUS2010/030610, International Search Authority—European Patent Office—Sep. 3, 2010.
Przemyslaw Machan et al: "Performance of mobility support mechanisms in a heterogeneous UMTS and IEEE 802.11 network offered under the IEEE 802.21 standard" Information Technology, 2008. IT 2008. 1st International Conference ON, IEEE, Piscataway, NJ, USA.
Bluetooth Specification Version 2.0 + EDR, Nov. 4, 2004, vol. 0-4, pp. 1-1230.

* cited by examiner

*Primary Examiner* — Clemence Han
(74) *Attorney, Agent, or Firm* — Dang M. Vo

(57) ABSTRACT

Techniques for wireless communications using two different physical layers with a common medium access control layer are provided.

53 Claims, 18 Drawing Sheets

| Field Value | Preferred fragment size (octets) |
|---|---|
| 000 | 1048576 |
| 001 | 262144 |
| 010 | 65536 |
| 011 | 16384 |
| 100 | 4096 |
| 101 | 2048 |
| 110 | 512 |
| 111 | Reserved |

FIG. 6

MAC ARCHITECTURES FOR WIRELESS COMMUNICATIONS USING MULTIPLE PHYSICAL LAYERS

CROSS-REFERENCE TO RELATED APPLICATION

This application claims benefit of U.S. Provisional Patent Application Ser. No. 61/168,207 filed Apr. 9, 2009, which is herein incorporated by reference in its entirety.

This application is related to U.S. application No. Ser. 12/756,362 filed on the same day as the present application.

TECHNICAL FIELD

The present disclosure generally relates to wireless communications and, more specifically, to multi-channel wireless communications.

BACKGROUND

The Institute of Electrical and Electronics Engineers (IEEE) 802.11 family of standards relate to wireless local area networks (WLANs) utilizing 2.4, 3.6 and 5 GHz frequency bands. The IEEE 802.15.3 family of standards relate to wireless Personal Area Network (PANs), including the IEEE 802.15.3c standard that defines a millimeter-wave-based physical layer that operates in a 57-64 GHz unlicensed band.

At least in part due to the different operating frequencies, an 802.11 WLAN may be more suitable for some applications than an 802.15 PAN, and vice-versa. Further complicating matters, various parameters, such as mobility of devices and changing environmental conditions may also mean that the optimal type of network in a given environment changes over time.

Accordingly, it would be desirable to have a system that provides the benefits of both networks and adapts to changing network environments.

SUMMARY

Certain aspects of the present disclosure provide a method for wireless communications. The method generally includes monitoring conditions of a wireless communications channel used to communicate with one or more wireless apparatuses, selecting between at least first and second physical layers for use in communicating with the wireless apparatuses based, at least in part, on the monitored conditions, and processing messages with a common media access control (MAC) protocol layer regardless of which of the first and second physical layers is selected.

Certain aspects of the present disclosure provide an apparatus for wireless communications. The apparatus generally includes a monitoring system configured to monitor conditions of a wireless communications channel used to communicate with one or more wireless apparatuses, a selecting system configured to select between at least first and second physical layers for use in communicating with the wireless apparatuses based, at least in part, on the monitored conditions, and a processing system configured to process messages with a common media access control (MAC) protocol layer regardless of which of the first and second physical layers is selected.

Certain aspects of the present disclosure provide an apparatus for wireless communications. The apparatus generally includes means for monitoring conditions of a wireless communications channel used to communicate with one or more wireless apparatuses, means for selecting between at least first and second physical layers for use in communicating with the wireless apparatuses based, at least in part, on the monitored conditions, and means for processing messages with a common media access control (MAC) protocol layer regardless of which of the first and second physical layers is selected.

Certain aspects of the present disclosure provide a wireless apparatus. The wireless apparatus generally includes at least one antenna, a monitoring system configured to monitor conditions of a wireless communications channel used to communicate with one or more wireless apparatuses, via the at least one antenna, a selecting system configured to select between at least first and second physical layers for use in communicating with the wireless apparatuses based, at least in part, on the monitored conditions, and a processing system configured to process messages with a common media access control (MAC) protocol layer regardless of which of the first and second physical layers is selected.

Certain aspects of the present disclosure provide a computer-program product for wireless communications. The computer-program product generally includes a computer-readable medium comprising with instructions executable to monitor conditions of a wireless communications channel used to communicate with one or more wireless apparatuses, select between at least first and second physical layers for use in communicating with the wireless apparatuses based, at least in part, on the monitored conditions, and process messages with a common media access control (MAC) protocol layer regardless of which of the first and second physical layers is selected.

BRIEF DESCRIPTION OF THE DRAWINGS

So that the manner in which the above recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 6 illustrates a table containing preferred fragment sizes.

DETAILED DESCRIPTION

Figure 1:
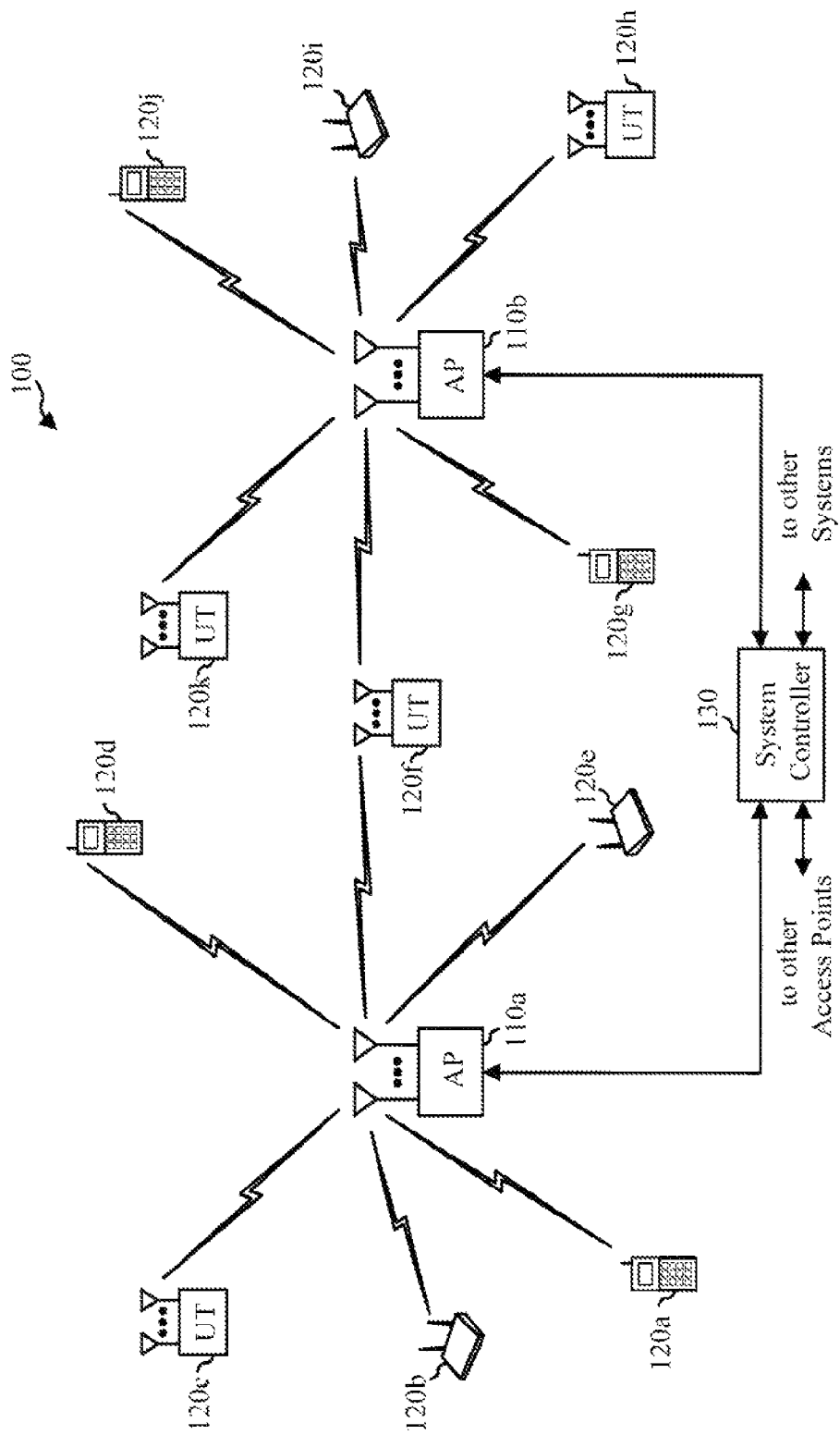
FIG. 1 illustrates a spatial division multiple access MIMO wireless system in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof The multi-antenna transmission techniques described herein may be used in combination with various wireless technologies such as Code Division Multiple Access (CDMA), Orthogonal Frequency Division Multiplexing (OFDM), Time Division Multiple Access (TDMA), and so on. Multiple user terminals can concurrently transmit/receive data via different (1) orthogonal code channels for CDMA, (2) time slots for TDMA, or (3) sub-bands for OFDM. A CDMA system may implement IS-2000, IS-95, IS-856, Wideband-CDMA (W-CDMA), or some other standards. An OFDM system may implement IEEE 802.11 or some other standards. A TDMA system may implement GSM or some other standards. These various standards are known in the art.

The teachings herein may be incorporated into (e.g., implemented within or performed by) a variety of wired or wireless apparatuses (e.g., nodes). In some aspects, a node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

An Example Mimo System

FIG. 1 illustrates a multiple-access MIMO system 100 with access points and user terminals. For simplicity, only one access point 110 is shown in FIG. 1. An access point (AP) is generally a fixed station that communicates with the user terminals and may also be referred to as a base station or some other terminology. A user terminal may be fixed or mobile and may also be referred to as a mobile station, a station (STA), a client, a wireless device, or some other terminology. A user terminal may be a wireless device, such as a cellular phone, a personal digital assistant (PDA), a handheld device, a wireless modem, a laptop computer, a personal computer, etc.

Access point 110 may communicate with one or more user terminals 120 at any given moment on the downlink and uplink. The downlink (i e , forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via spatial division multiple access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

System 100 employs multiple transmit and multiple receive antennas for data transmission on the downlink and uplink. Access point 110 is equipped with a number $N_{ap}$ of antennas and represents the multiple-input (MI) for downlink transmissions and the multiple-output (MO) for uplink transmissions. A set $N_u$ of selected user terminals 120 collectively represents the multiple-output for downlink transmissions and the multiple-input for uplink transmissions. For pure SDMA, it is desired to have $N_{ap} \geq N_u \geq 1$ if the data symbol streams for the $N_u$ user terminals are not multiplexed in code, frequency, or time by some means. $N_u$ may be greater than $N_{ap}$ if the data symbol streams can be multiplexed using different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

MIMO system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported).

Figure 2:
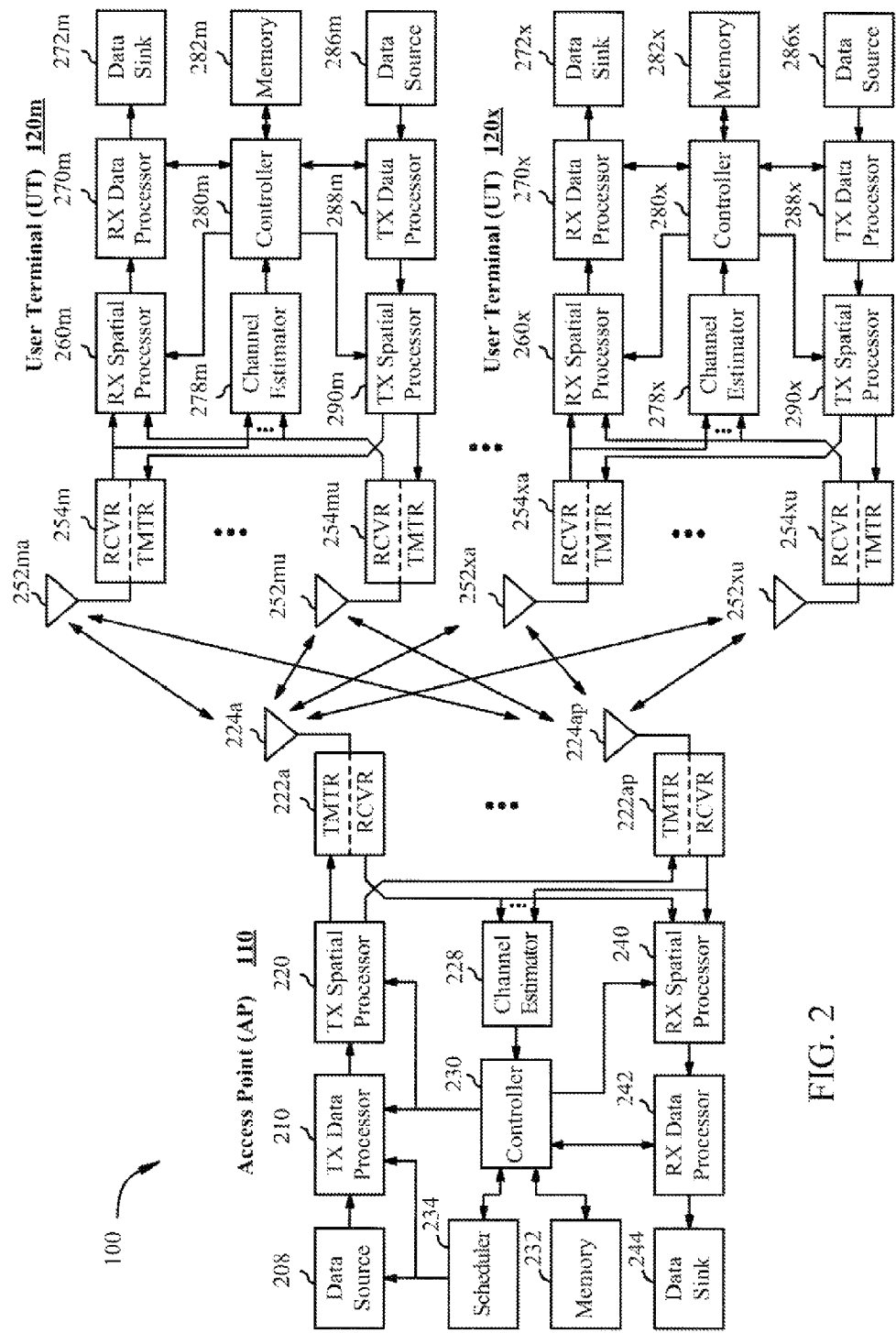
FIG. 2 illustrates a block diagram of an access point and two user terminals in accordance with certain aspects of the present disclosure.

FIG. 2 shows a block diagram of access point 110 and two user terminals 120m and 120x in MIMO system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point 110.

A number $N_{up}$ of user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream $\{s_{up,m}\}$ is an estimate of a data symbol stream $\{s_{up,m}\}$ transmitted by a respective user terminal. An RX data processor 242 processes (e.g., demodulates, deinterleaves, and decodes) each recovered uplink data symbol stream $\{s_{up,m}\}$ in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing on the $N_{dn}$ downlink data symbol streams, and provides $N_{ap}$ transmit symbol streams for the $N_{ap}$ antennas. Each transmitter unit (TMTR) 222 receives and processes a respective transmit symbol stream to generate a downlink signal. $N_{ap}$ transmitter units 222 provide $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{s_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{s_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

Figure 3:
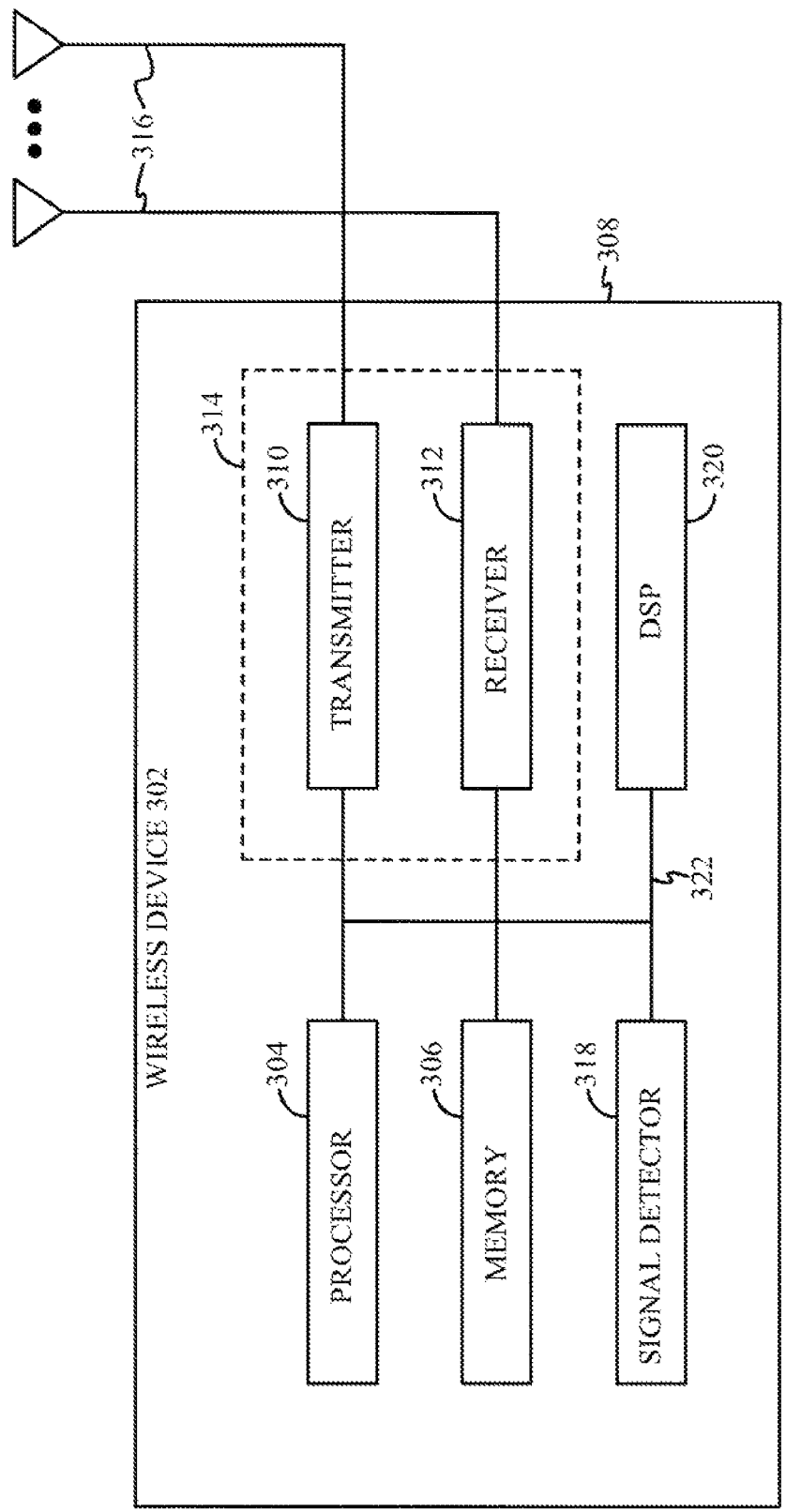
FIG. 3 illustrates example components of a wireless device in accordance with certain aspects of the present disclosure.

FIG. 3 illustrates various components that may be utilized in a wireless device 302 that may be employed within the system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

As used herein, the term "legacy" generally refers to wireless network nodes that support 802.11n or earlier versions of the 802.11 standard.

While certain techniques are described herein with reference to SDMA, those skilled in the art will recognize the techniques may be generally applied in systems utilizing any type of multiple access schemes, such as SDMA, OFDMA, CDMA, and combinations thereof.

Mac Architectures for Next Generation WLAN Augmented with 60 Ghz Phy

Certain aspects of the present disclosure provide an architecture the utilizes a medium access control (MAC) layer for that supports two physical (PHY) layers with may have different properties, such as a 5 GHz PHY and a 60 GHz PHY. The techniques presented herein may enable certain features, such as an automatic failover to enable switching from the use of one physical layer to the other, for example, when operating conditions favor the other physical layer. Certain aspects may also provide for partitioning of MAC functions, such as aggregation, that help facilitate the architecture design utilizing a common MAC layer. Certain aspects may also provide an access point—coordinated connection set up for peer-to-peer operation, for example, utilizing a stand-alone 60 GHz PHY through a (5 GHz) MAC conventionally associated with a different type PHY.

Figure 4:
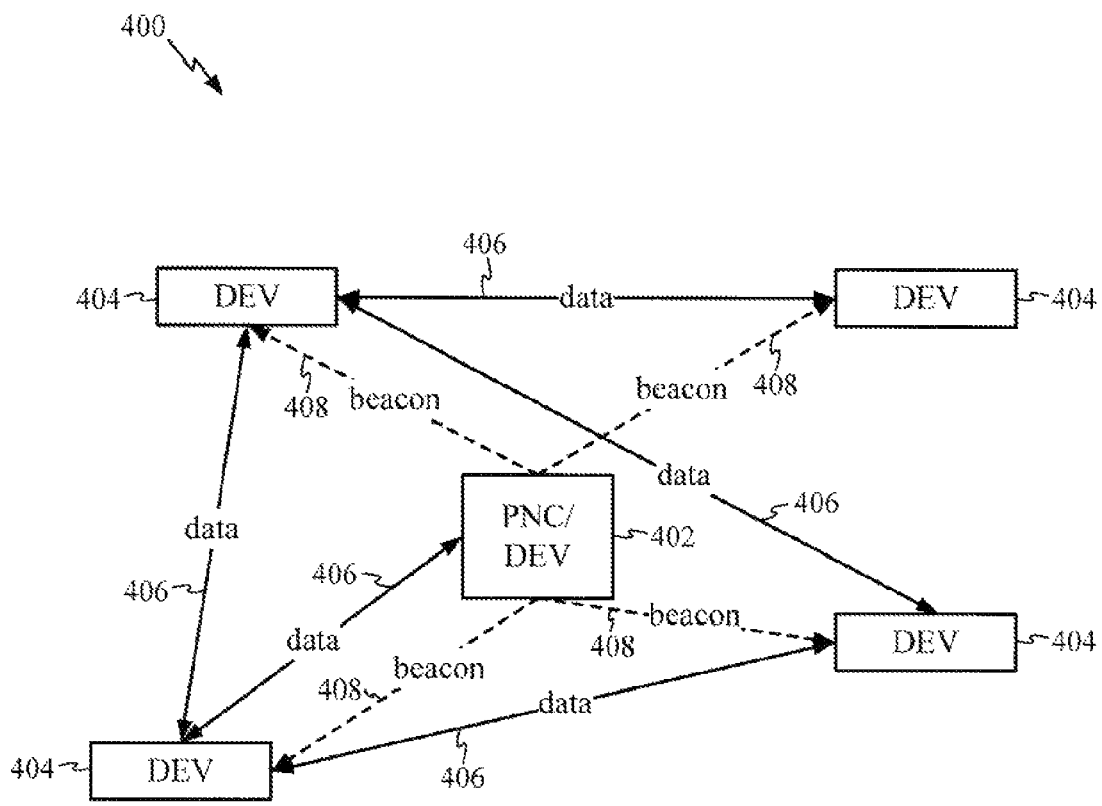
FIG. 4 illustrates example piconet elements.

An example piconet network architecture in accordance with the Institute of Electrical and Electronics Engineers (IEEE) 802.15.3 standard is illustrated in FIG. 4. As illustrated, a Piconet 400 may consist of Piconet Coordinator (PNC) 402 and Devices (DEV) 404. The PNC may transmit beacon 408 messages and may receive data 406 from the devices. The PNC may also set the timing for MAC superframes.

Figure 5A:
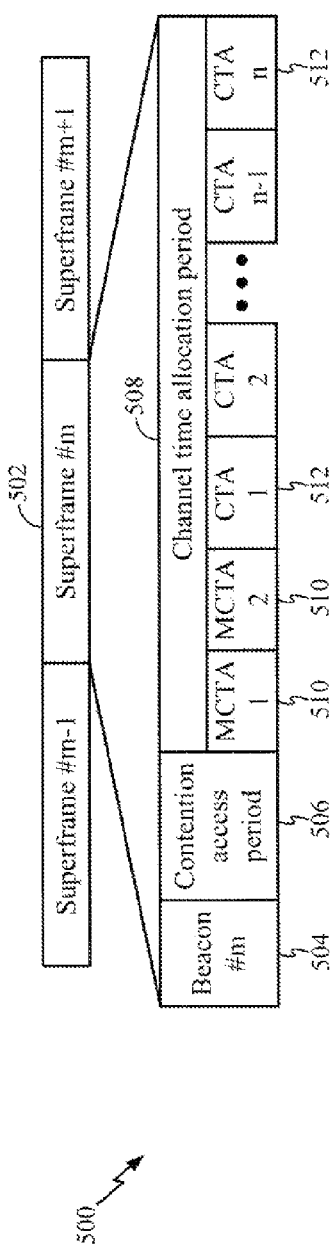
FIGS. 5A-5B illustrate example superframe structures.

FIG. 5A illustrates a superframe 502 in the IEEE 802.15.3 standard. As illustrated, the superframe may include a Beacon 504, contention access period (CAP) 506, management channel time allocation (MCTA) 510 and channel time allocation (CTA) 512 messages. The Beacon 504 may be transmitted by the PNC 402, which may provide synchronization, and may allocate the CTA slots. A CAP message 506 may contain transmit requests and association. The CTA period 508 may be used for data transmission in CTA slots 512. The optional MCTA message 510 may be utilized for management frames.

Figure 5B:
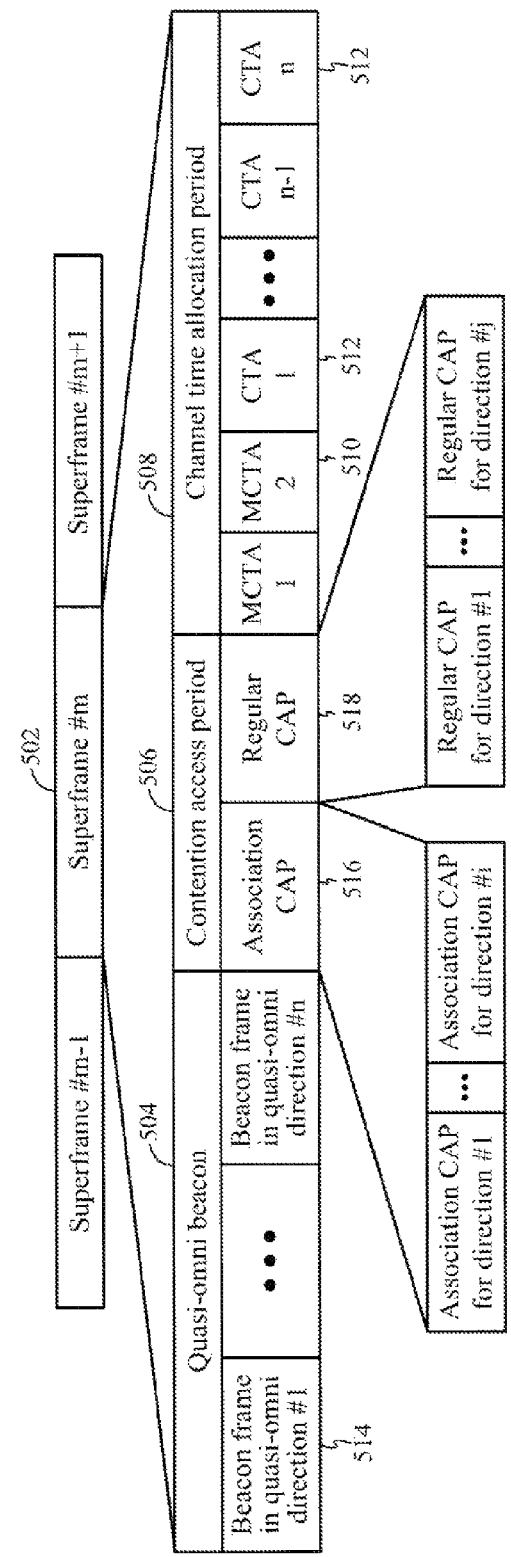

FIG. 5B illustrates an example structure of a Piconet superframe 502 in quasi-Omni mode, as defined in the IEEE 802.15.3c standard. As illustrated, the superframe 502 may accommodate directional transmissions. For example, the superframe 502 in quasi-Omni mode may include quasi-Omni beacon 504, contention access point 506 and channel time allocation period 508. A beacon message 504 in FIG. 5A may be replaced with the quasi-Omni beacon that may contain a plurality of beacon frames for different quasi-Omni directions 514. The contention access period 506 may contain association CAP messages 516 and regular CAP 518 messages for different directions. The channel time allocation period 508 may include directional MCTA 510 and CTA 512 messages.

The physical layer of the IEEE 802.15.3c standard supports three modes, such as single carrier (SC) mode that supports data rates up to 3 Gbps, high speed interface (HIS) mode that utilizes orthogonal frequency division multiplexing (OFDM) technology and Low Density Parity Check (LDPC) codes, and AV mode that employs OFDM technology with a convolution encoder. Fragment sizes that are supported in IEEE 802.15.3 standard are illustrated in the table in FIG. 6.

The IEEE 802.15.3c standard adds aggregation and block-ACK to the IEEE 802.15.3 standard. Aggregation may be performed, for example, for high-speed data/video transmission or low latency bidirectional data transmission. There are two basic aggregation methods that may be used, which may be referred to as a standard aggregation mode and a low latency aggregation mode.

Figure 7:
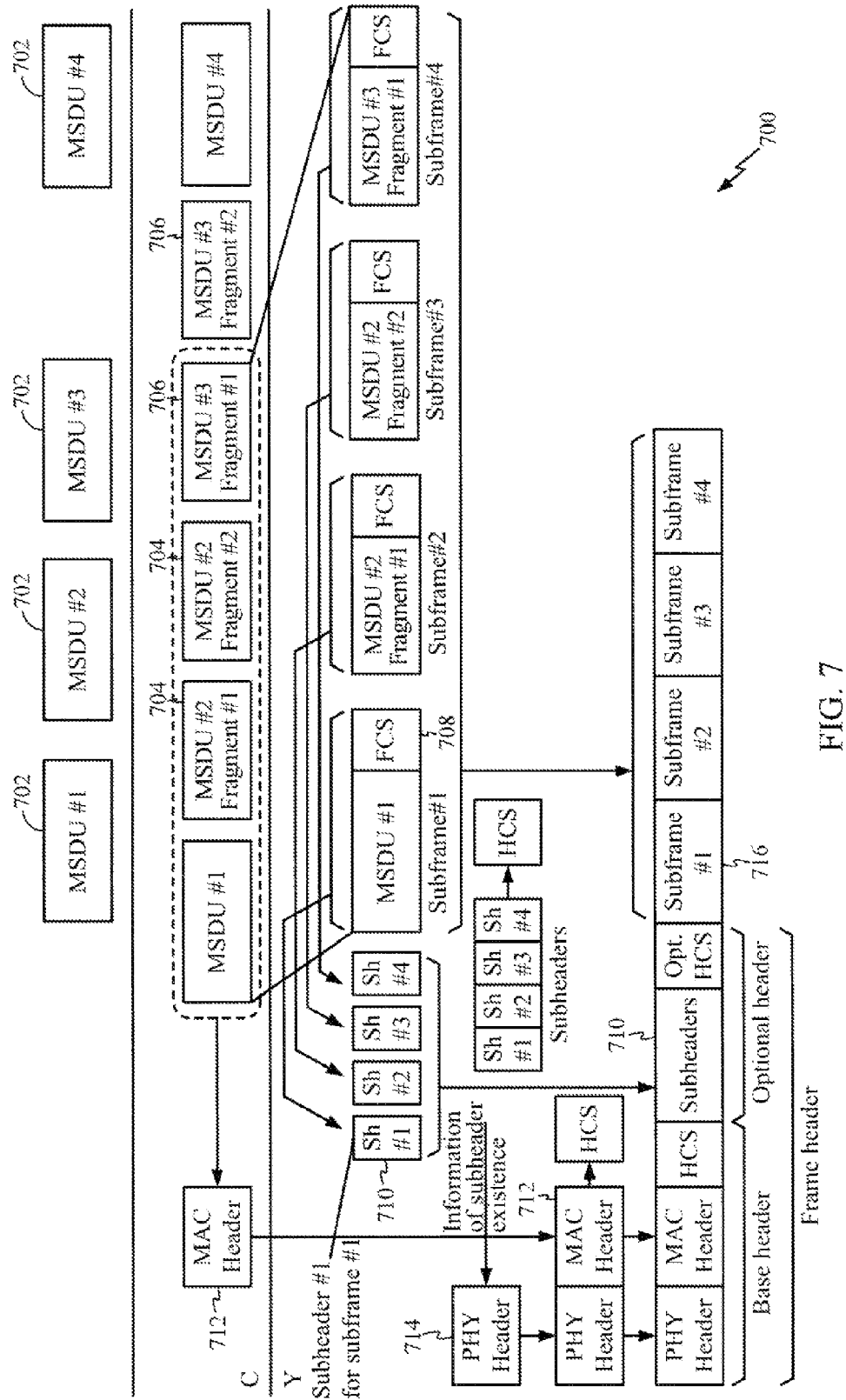
FIG. 7 illustrates example aggregation at a source in accordance with IEEE 802.15.3 standard.

FIG. 7 illustrates standard aggregation. As illustrated, the originating DEV, upon receiving an MSDU message 702, may map it into a subframe payload 716. If the length of the MSDU exceeds a predetermined value (refer to FIG. 6) indicated in the Preferred Fragment Size field in Capability IE, the MSDU may be fragmented 704-706 and mapped into multiple subframe payloads. Each MSDU may be assigned a unique MSDU number for identification. If fragmentation is adopted, each fragment may be assigned a fragment number for identification within the MSDU.

All the fragments of the same MSDU may have the same MSDU number. A subheader 710 may be created and configured for each subframe to contain the necessary information that helps the target DEV to retrieve the original data. If fragmentation is used, the fragment number of each subframe may be written in the Fragment Number field of subheader. This field may be set to zero if the subframe contains an unfragmented MSDU.

The MSDU number of the first subframe may be placed in the MSDU Number field of the Fragmentation Control field in the MAC header 712 as the reference for the target DEV to calculate the MSDU number of each subframe 716. The ACK Policy field in MAC header may be set to Block-ACK. All the subheaders are combined together to form the MAC subheader.

Certain aspects of the present disclosure provide an architecture that may include components based on an IEEE 802.11 system, but augmented with 60 GHz capability. Several MAC/PHY alternatives exist for 60 GHz operation, such as ultra wide band (UWB), ECMA, wireless universal serial bus (USB), and IEEE 802.15.3c standard. Certain features of the IEEE 802.15.3c PHY definition may make it a suitable choice as a PHY to be integrated with IEEE 802.11. Certain aspects of the present disclosure describe techniques that may be performed in order to integrate certain aspects of IEEE 802.15.3c (a "lite" IEEE 802.15.3c) into IEEE 802.11.

Figure 8:
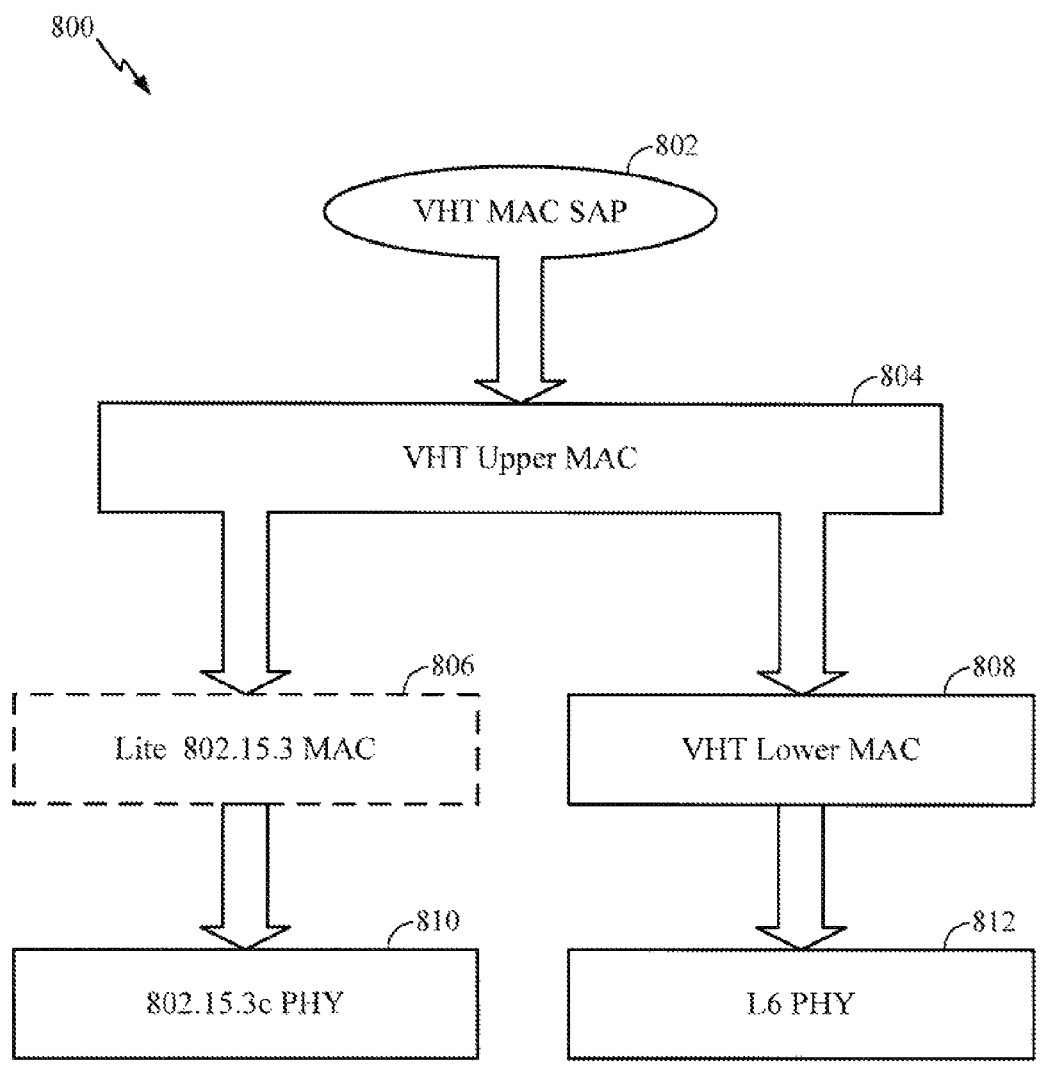
FIG. 8 illustrates an example architecture in accordance with certain aspects of the present disclosure.

FIG. 8 illustrates an example architecture, illustratively containing a very high throughput medium access control (MAC) and two physical layers in accordance with certain aspects of the present disclosure. In this architecture, a MAC server access point (MAC SAP) 802 may communicate with an upper MAC 804 (e.g., an 802.11 compliant upper MAC). The upper MAC may communicate, for example, with either a lite IEEE 802.15.3 MAC 806 (e.g., with possibly reduced functionality relative to the IEEE 802.15.3 standard) or an 802.11 lower MAC 808, each of which may communicate with a 802.15.3c PHY 810 or a L6 PHY 812, respectively. Thus, according to certain aspects, the Upper MAC may switch between the two systems seamlessly.

Figure 9:
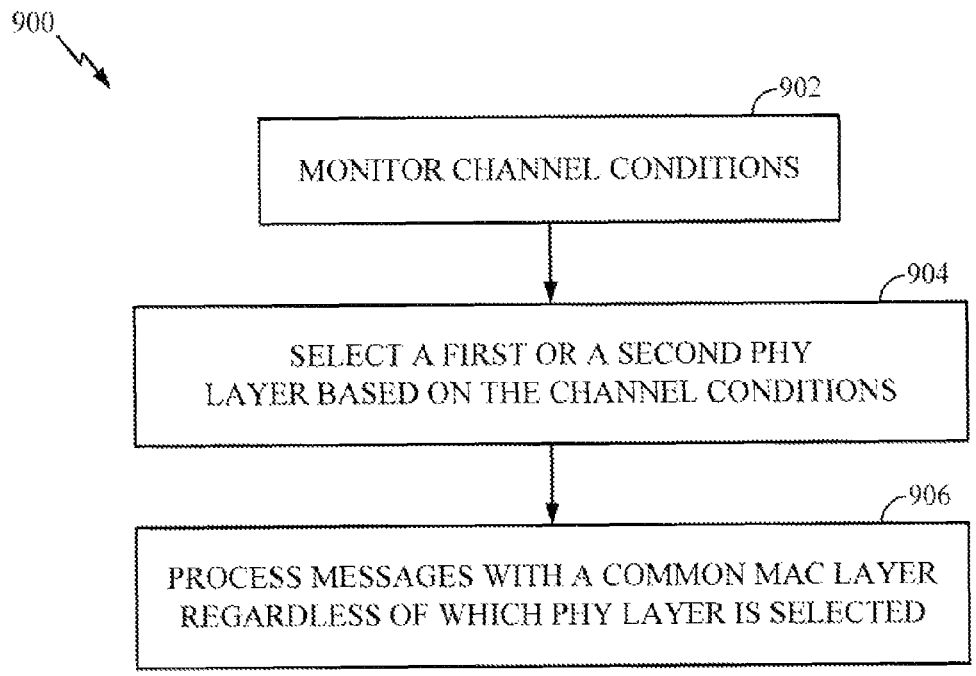
FIG. 9 illustrates example operations for utilizing a MAC architecture augmented with two physical layers, in accordance with certain aspects of the present disclosure.

FIG. 9 illustrates example operations 900 for a MAC architecture augmented with two physical layers, in accordance with certain aspects of the present disclosure. The operations 900 will be described with reference to an access point (AP), but may also be performed by another wireless device (e.g., a user terminal or station).

The operations begin, at 902, the AP monitors the channel conditions. At 904, the AP selects a first or a second PHY layer based on the channel conditions. At 906, the AP processes messages with a common MAC layer regardless of which PHY layer is selected. The operations 900 may be performed, for example, to failover from a first PHY to a second PHY when the channel conditions warrant.

According to certain aspects of the present disclosure, two MAC architectures may be used for augmenting a 60 GHz PHY into a system utilizing IEEE 802.11 standard (the two MAC architectures may be referred to herein as type I and type II).

In a type-I MAC architecture, an IEEE 802.11 MAC Protocol Data Unit (MPDU) or an Aggregate MAC Protocol Data Unit (AMPDU) may be similar to a MAC Service Data Unit (MSDU) for the 802.15.3 lite MAC. In this architecture, the IEEE 802.15.3c aggregation capability may not be supported. Data traffic may switch between the L6 PHY and 60 GHz PHY without any change in the MAC state. In addition, aggregate sizes may not dynamically change to reflect 60 GHz PHY conditions. This architecture may use the IEEE 802.11 security features.

Figure 10:
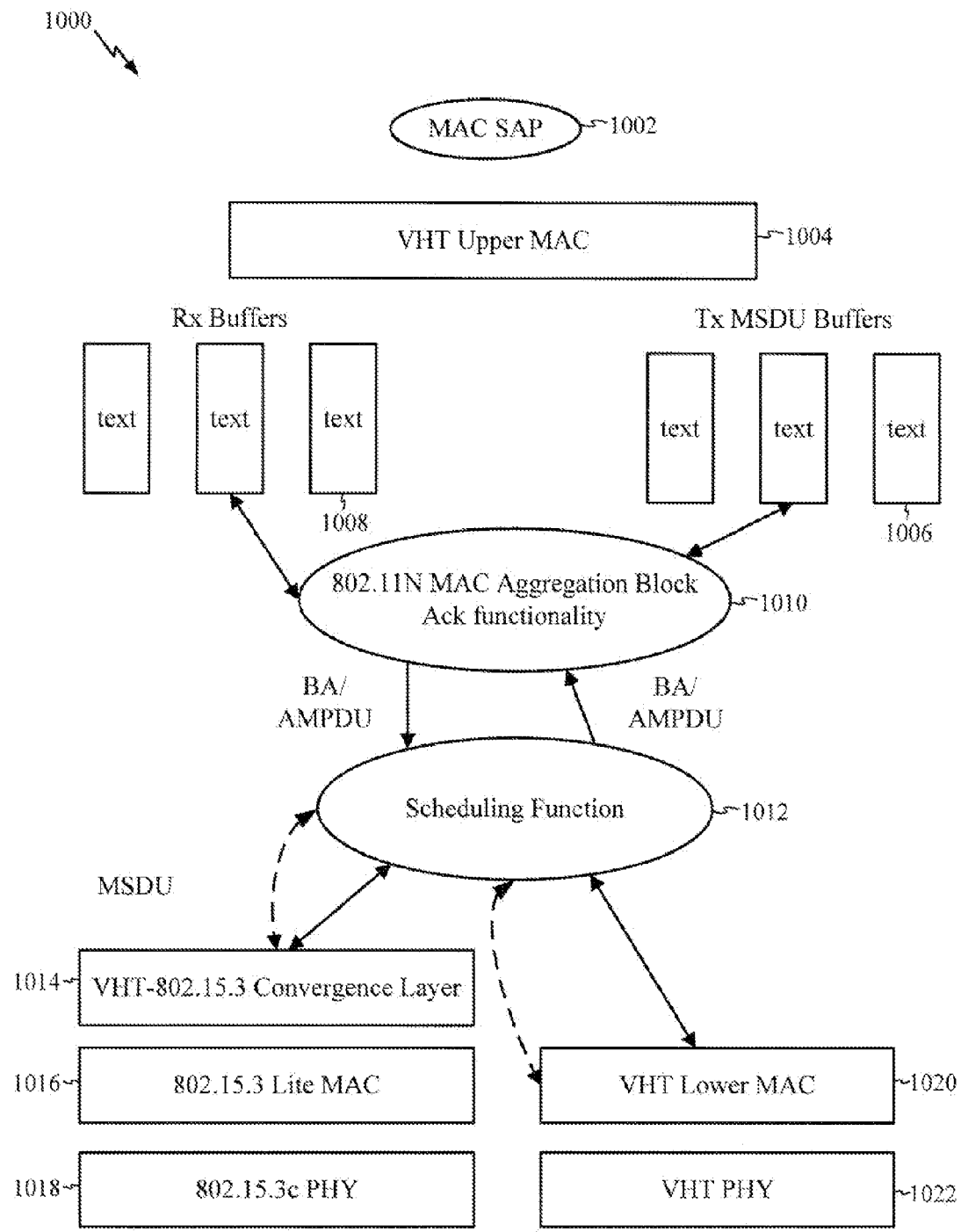
FIG. 10 illustrates an example architecture in accordance with certain aspects of the present disclosure.

FIG. 10 illustrates a type-I MAC architecture in accordance with certain aspects of the present disclosure. In the illustrated example, the connections between the upper MAC 804, lower MAC 808 and a "lite 802.15" MAC 806 blocks in FIG. 8 are illustrated in more detail.

As illustrated in FIG. 10. between the upper MAC 1004 and the lower MAC 1016, 1020, there may be transmit MSDU buffers 1006 and receive buffers 1008 to store the intermediate values. As illustrated, the buffers may be connected to the 802.11 MAC aggregation block-Ack functionality 1010 block. This block may be connected to a scheduling function block 1012 that communicates with an 802.11-802.15.3c convergence layer 1014 and lower MAC block 1020.

The 802.11-802.15.3 convergence layer 1014 performs the following operations: On the transmitter side, the convergence layer may accept AMPDU messages from transmit buffer. If size of an AMPDU message is large, the convergence layer may fragment the frame to several smaller frames suitable for 60 GHz transmission. The convergence layer may also send a pseudo Block-ACK (BA) to the MAC. In addition, the convergence layer may control the traffic-flow-rate from transmitter buffers to the 60 GHz interface. On the receive side, the convergence layer may forward fully assembled A-MPDUs to the upper MAC. It may also drop the Block-ACK generated by -MAC.

Figure 11:
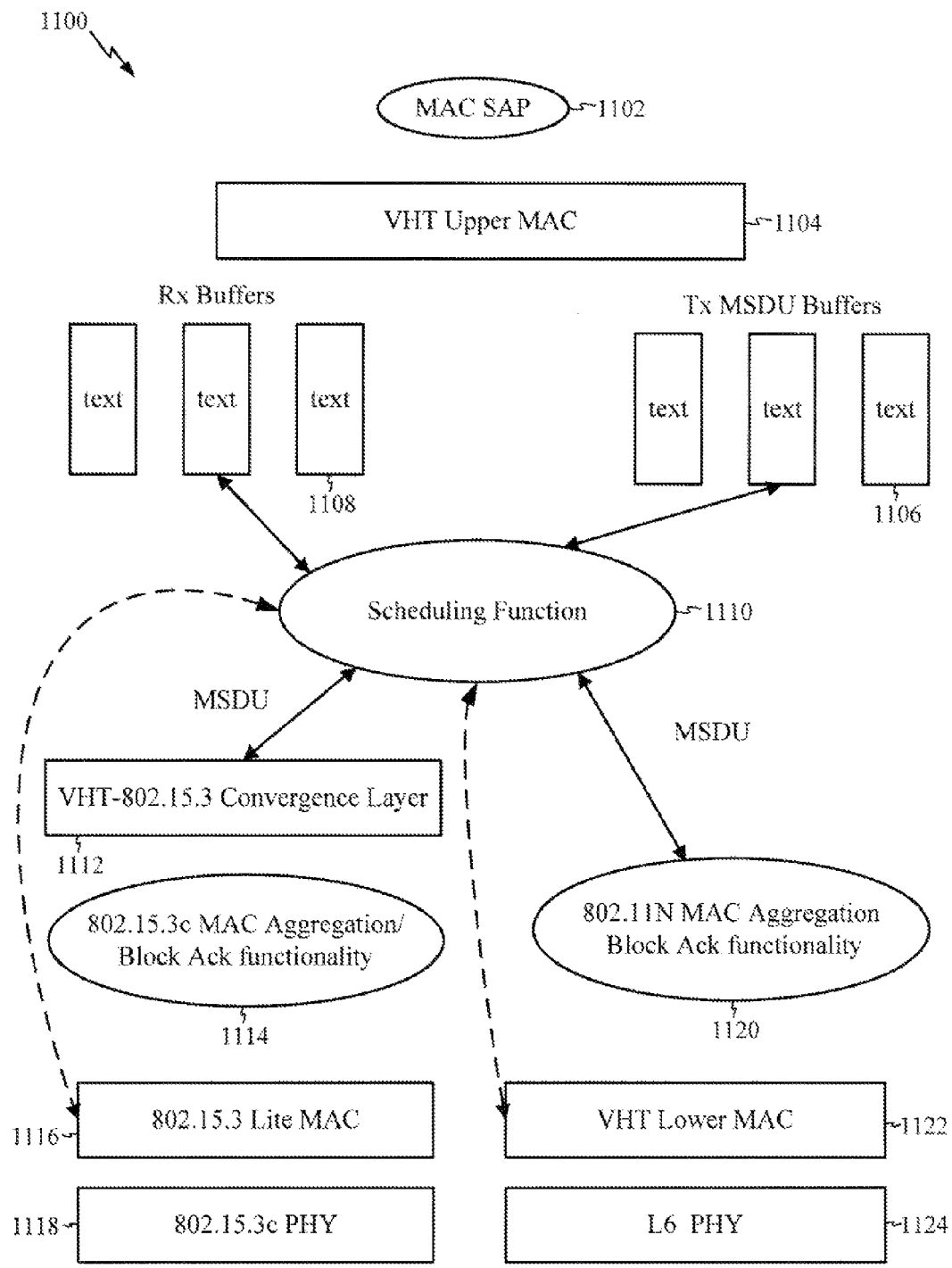
FIG. 11 illustrates an example architecture in accordance with certain aspects of the present disclosure.

FIG. 11 illustrates an example type-II MAC Architecture, in accordance with certain aspects. This architecture contains a MAC SAP 1102, upper MAC 1104, receive buffers 1108, transmit buffers 1106, scheduling function 1110, 802.11-convergence layer, 1112, MAC aggregation block-ACK functionality for IEEE 802.15.3c 1114 and IEEE 802.11n 1120, lower MAC and PHY blocks similar to their counterparts in FIG. 10. In the type-II architecture, unlike the type-I MAC architecture, the aggregation and BA functionalities are performed separately for each PHY. There are separate state machines 1114, 1120 for BA functionality of each PHY interface, since dynamic switching between interfaces requires complex state managements. In this architecture, number of the scheduled MSDUs may be adapted dynamically based on the conditions of the 60 GHz PHY.

For certain aspects of the present disclosure, at least two modes of aggregation may exist in a type-II MAC Architecture, such as standard aggregation and low latency aggregation. Low latency aggregation may be useful for applications with many small packets. In the type-II MAC architecture, fail over may be supported for applications that utilize standard aggregation. There is no fail-over support for traffic using low latency aggregation. The window size may be 8 MSDUs for standard aggregation.

In MAC Architecture type-II, certain mechanisms may be utilized to allow convergence between the two different protocols corresponding to the two different PHYs. For example, a sequence number state may be shared between L6 and 60 GHz PHY.

For certain aspects of the present disclosure, a sequence number management may be performed by following two scenarios. In the first scenario, IEEE 802.11 MPDUs may be sent on the 60 GHz interface. The IEEE 802.15.3 interface may append an IEEE 802.15.3 MAC header onto the IEEE 802.11 MPDUs. Mapping between the sequence numbers of the IEEE 802.15.3 and the IEEE 802.11 MPDU may be maintained at the transmitting side. The 802.15.3c aggregation/block ACK may be utilized for these augmented MPDUs. In this architecture, the convergence layer may keep track of successful reception of MPDUs. Windowing may be maintained with 802.11 sequence numbers. Windowing may result in an increased overhead due to the additional 802.15.3 MAC overhead. However, windowing has the benefits of simpler switch-over, since the states of the IEEE 802.11 PHY is continuously maintained. In the type-II MAC architecture, the IEEE 802.11 security feature may be used.

The sequence number management in MAC Architecture type-II may be performed by following a second scenario as follows. The IEEE 802.15.3 convergence layer may utilize the IEEE 802.11 MAC header to generate 10 bit sequence number with the last 10 bits of the MPDU sequence number. The convergence layer may also map the Traffic Identification (TID) to an IEEE 802.15.3 Stream Index. For the circumstances in which a fail over is required, the convergence layer may send a control frame that includes a TID to Stream Index map, and the two most significant bits (MSB) of the IEEE 802.11 sequence number. It should be noted that a fail over Control frame may need to be acknowledged before L6 data transfer begins.

For certain aspects of the present disclosure, two modes of operations may exist for network operations with L6 interface, such as access point to station, or station to station communications. For access point to station operation, the access point may be viewed as a PNC. A station may associate with an AP using 802.11 association, during which the station informs the AP of the 60 GHz functionality. The AP may assign an IEEE 802.15.3 device ID (DEVID) to the station. The station may scan the 60 GHz channels for a beacon message from the AP. Once the station receives a beacon from the AP, it may send a request message using its DEVID. If the station is unable to find a beacon from the AP within a timeout period, it may return the DEVID.

According to certain aspects, station to station communication may be with or without supervision of an AP. For the station to station operation with supervision of an AP, Direct Link Setup (DLS) functionality may be employed. The stations may inform the AP of the 60 GHz functionality by sending a DLS request to the AP. Upon receiving the request, the AP may enable the two stations to set up a Pico-net.

When the two stations (STAT and STA2) with 60 GHz capability request for a DLS connectivity, the AP may attempt to use a 60 GHz interface. Both stations need to communicate with the AP similar to the communication they may have had with a PNC. The AP may allocate two Contention-Free Period (CFP) slots in a plurality of the next 60 GHz frames to allow the stations to probe each other and determine a feasible rate. When probe messages are exchanged successfully, STA1 and STA2 may inform the AP of the possibility of a direct link connection between the two stations.

If the stations attempt to setup a connection without supervision of an AP, one of the stations may act as a Pico node. The two stations may perform the following steps: A station (STA1) may send a DLS request with 60 GHz functionality to another station (STA2). If the STA1 is already a PNC, the AP may send the Piconet Identification (PNID) of the STA1 to the STA2 and may instruct the STA2 to join the STA1 as a Piconet. If neither STA1 nor STA2 is a PNC, the AP may instruct the STA1 to form its own Piconet and communicate with the STA2. Therefore, the STA1 may either attempt to create a "child" Piconet and keep the AP as a controller or create a Piconet on a free channel. After creating a Piconet, the STA1 may send information about its PNID and channel to the AP. Upon receiving this information, the AP may send the PNID of the STA1 to the STA2. It may also instruct the STA2 to join the Piconet of STA1. When a connection between STA1 and STA2 is established, they inform the AP to complete the DLS setup procedure, after which the stations may start to transfer data through their established direct link.

According to certain aspects of the present disclosure, a 60 GHz network may operate in stand-alone mode by encapsulating for the IEEE 802.11 MAC frame into an IEEE 802.15.3 MAC frame.

Figure 12:
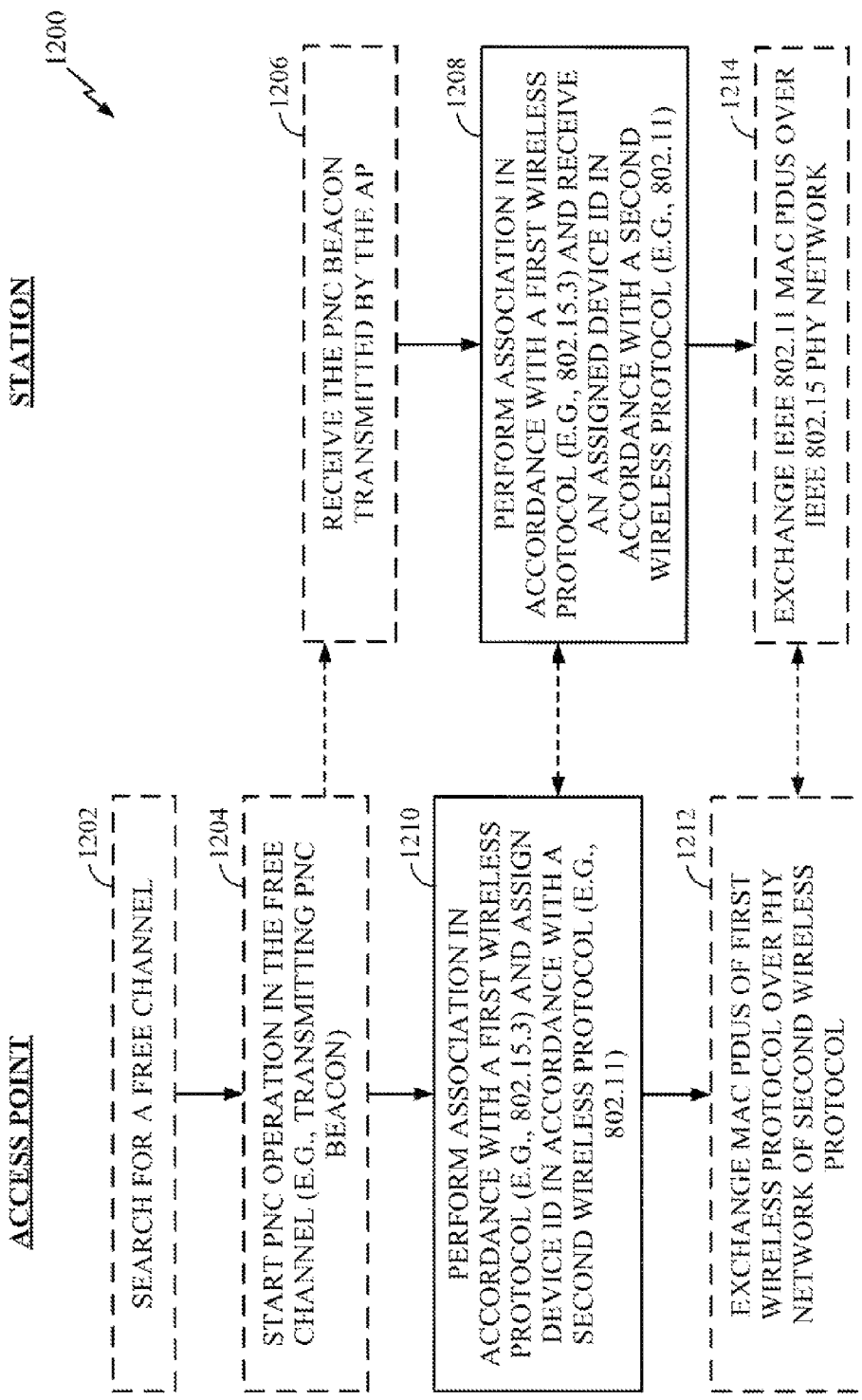
FIG. 12 illustrates example operations for network operations in stand-alone 60 GHz mode in accordance with certain aspects of the present disclosure.

FIG. 12 illustrates example operations that may be performed, for example, for stand-alone 60 GHz network operation. When an AP is powered up, at 1202, the AP may search for a free channel. At 1204, The AP may start PNC operation in the free channel such as transmitting PNC beacon (e.g., in which the AP may place an SSID that is associated to it in the IEEE 802.11 network). At 1206, a station receives a PNC beacon from an AP (e.g., and may extract the SSID).

At 1208 and 1210, (e.g., if the station is allowed to associate with the AP based on the SSID), the STA and AP begin association according to a first wireless protocol (e.g., IEEE 802.15.3 standard) and a device ID is assigned according to a second protocol (e.g., the 802.11 SSID transmitted in a beacon as described above). Once association is complete, at 1212, 1214 the station and the access point may exchange MAC PDUs of the first wireless protocol over the physical network of the second protocol (e.g., exchanging IEEE 802.11 frames encapsulated in 802.15.3 MAC frames).

For certain aspects of the present disclosure, stations that are one hop away (Level One STAs or LOSTAs) from the PNC may form child-Piconets if necessary, in which one of the stations may act as a PNC. A LOSTA may send a PNC beacon to indicate that they are LOSTAs. The PNC beacon may include the PNID of the LOSTA, and the SSID of the AP. A beacon period may be set to large if no station is associated with a LOSTA. The beacon period may be set equal to the AP beacon period, when at least one station is associated with the LOSTA. A station may associate with a LOSTA, if the station is unable to receive a beacon message from the AP, or if the bit-rate to the AP is too low. Therefore, the LOSTA may forward the IEEE 802.11 association messages from the station to the AP.

For certain aspects of the present disclosure, when the IEEE 802.15 nodes are operating in stand-alone mode, the AP may use security mechanisms for data as defined in IEEE 802.11i standard. Authentication of the stations may be done through an AP. The stations that cannot be authenticated may be disassociated.

For the 60 GHz IEEE 802.11 ad operation, stations may maintain a "virtual 802.11 association/session" with the AP. Therefore, control messages may be forwarded through an AP-LOSTA hierarchy. An IEEE 802.15.3 packet type may be defined for 802.11 control/management messages. Internet Protocol (IP) addresses may be assigned to the stations by the AP through Dynamic Host Configuration Protocol (DHCP) process. The AP and all the stations associated with it may form a single subnet. The stations may access external networks through the AP. Multi-hop routing via 60 GHz may also be enabled.

For certain aspects of the present disclosure, in order to set up peer to peer connections, peer discovery may be carried out using a DLS set up procedure. Stations may forward DLS messages to the AP. If the stations are associated with different LOSTAs, the AP forces one of the stations to move so that both peers are part of the same PNC network. The DLS may be terminated if such an operation may be not possible. The AP may sets up the channel time allocations (CTA) to satisfy the quality of service (QoS) requirements of the DLS flows. A LOSTA who acts as a PNC may be instructed on a CTA to allocate channel for DLS connection.

Figure 13:
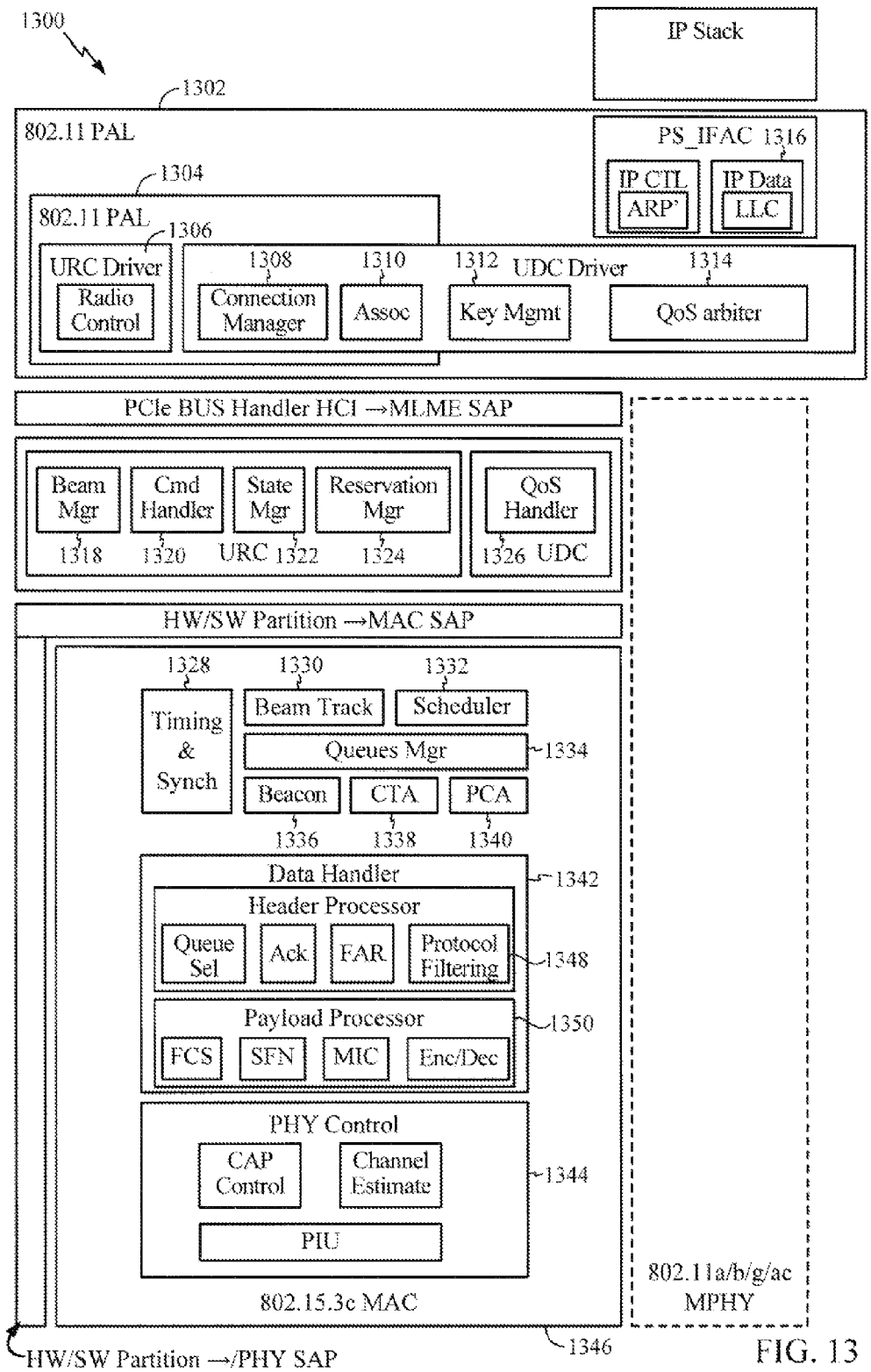
FIG. 13 illustrates a partition of example components, in accordance with certain aspects of the present disclosure.

FIG. 13 illustrates logical block diagram of 60 GHz operation in accordance with certain aspects of the present disclosure. A protocol stack may contain a protocol adaptation layer (PAL) block 1302, 1304 and a medium access control (MAC) block 1346. The PAL block consists of device and radio control 1306 components. The device control components include QoS arbitrator 1314, associate 1310, key management 1312, connection manager 1308 and a QoS handler 1326. The QoS arbitrator 1314 may manage which stream goes to which outgoing queue based on priority and available modems. The associate block 1310 may handle the association between peers. The key management block 1312 may handle the key exchange and storage. The connection manager block 1308 may manage the connection state machine including connection with the PNC/AP, neighbors, etc. The QoS handler 1326 may manage which stream goes to which outgoing queue based on priority and available reservations. For example, in IEEE 802.15.3c standard, the available reservations may be CTA or CAP.

The radio control components include command handler 1320, state manager 1322, reservation manager 1324 and beam manager 1318. The command handler 1320 may process the Ultra Wide Band (UWB) Radio Controller Driver (URCD) requests and schedules URCD responses. The Command Handler may also be responsible to route the URCD commands and notifications to command frames, beacon IEs and other PAL traffic. The state manager block 1322 may be responsible for initialization of the MAC layer, scanning and beaconing control. The reservation manager block 1324 may be maintaining local piconet time slot availability and interference. The reservation manager block may be also responsible for CTA negotiation. The beam manager 1318 may be responsible for beam steering.

The MAC block in the protocol stack may include a scheduler 1332, queue manager 1334, beacon 1336, beam track 1330, data handler 1342, and PHY control 1344. The scheduler 1332 may receive requests for allocations and may determine scheduling time using CTA, CAP or both. The queue manager 1334 may manage the queues that are used for acknowledging or ordering incoming frames. In addition, the queue manager may verify transmission success of outgoing frames. The beacon block 1336 may generate outgoing beacons, may parse incoming beacons and may maintain beacon synchronization. The beam track block 1330 may be responsible for beam steering handshake protocol. The data handler 1342 may retrieve and may store data packets in memory. The data handler may also handle data packet encryption and checksum verification. The protocol filtering 1348 may drop unrelated incoming frames and may handle special command and control frames to reduce the processing required by the host software. The header processor may build the MAC frame header. The payload processor 1350 may build the frame payload. The PHY control 1344 may implement channel estimation and may manage the CAP radio-related functionalities. The PHY control may communicate with PHY block using register IF.

Figure 14:
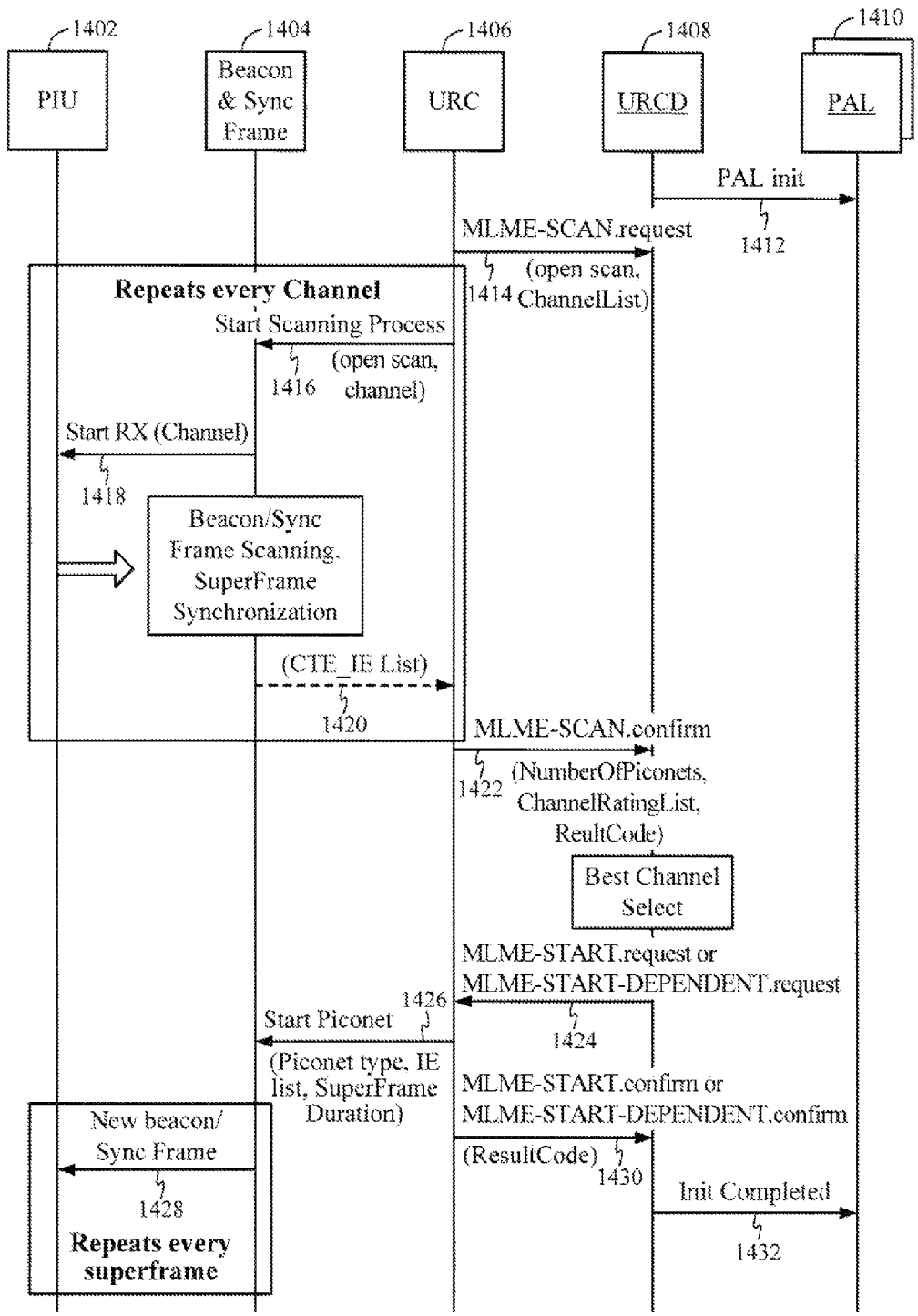
FIG. 14 illustrates an example Piconet startup flow in accordance with certain aspects of the present disclosure.

A Piconet startup flow according to certain aspects of the present disclosure is illustrated in FIG. 14. At startup, the PAL 1410 instructs the URCD 1408 to initialize by sending a "PAL Init" 1412 command. This command includes information about the PAL and the application specific information elements (IEs). The URCD initiates channel scan 1414 by URC 1406. For every channel, the steps 1416, 1418 and 1420 may be performed. The beacon block 1404 may perform scanning 1416, IE filtering and time synchronization. The CTA IE list 1420 from the beacons 1404 or sync frames may be transferred to the URC upon correct detection. Notifications from the beacon are transferred 1422 to the URCD 1408. It may be the responsibility of the URCD block to select best channel and decide which Piconet type to start (i.e., independent, child, virtual dependent).

Upon completion of scanning, the URCD 1408 may send start 1424 command to the URC 1406. The URC prepares the IEs 1426 for transmission. The beacon block prepares new beacon and/or sync frame 1428 for every super frame. The frequency of sync frame transmission may be controlled by a parent PNC. When the startup procedure completes, the URCD sends "Init Complete" message 1432 to the PAL blocks 1410.

Figure 15:
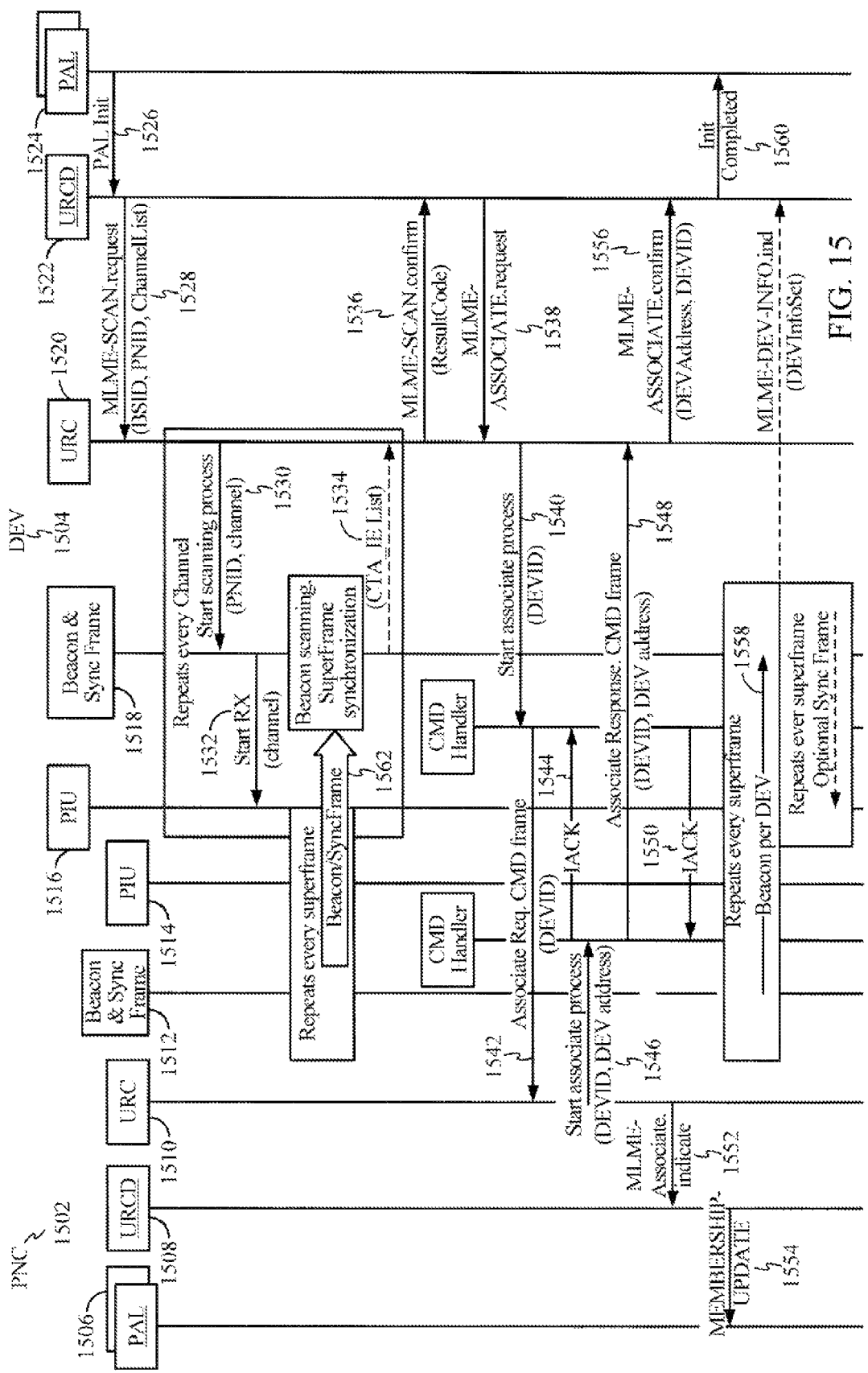
FIG. 15 illustrates an example flow diagram for device connection and association in accordance with certain aspects of the present disclosure.

Device Connection and Association may be performed as follows. The Piconet coordinator and devices may all be capable of Omni-directional transmission. FIG. 15 illustrates the steps performed during synchronization of a device (DEV) 1504 with a PNC 1502. The PAL 1524 may instruct the URCD 1522 to initialize by sending a "PAL Init" command 1526. This command may include information about the PAL and the application specific IEs. The URCD may initiate PNC scan 1528 by URC 1520. The beacon block 1518 may perform scanning 1530, 1532, 1534, IE filtering and time synchronization 1562 for every channel. Notifications from the beacon 1536 may be transferred to the URCD 1522. The URCD may select which Piconet to join.

During PNC association, the URCD 1522 of a DEV 1504 may send an associate request message 1542 to the URC 1510. Association may be handled by exchanging command frames between the DEV and a PNC. The URC 1510 of the PNC 1502 may send associate indication notification 1548, 1556 message to the URCD 1522. When the association is complete, the URCD of the DEV may send an "Init Complete" 1560 message to the PAL 1524. The URCD of the PNC 1508 may send a "Membership update" message 1554 to the PAL 1506. The URCD of the other devices on a network may send "DEV INFO" message to the PAL.

There may be an optional frame synchronization for which the beacon block may prepare sync frame. The frequency of frame synchronization transmission may be controlled by the PNC.

Figure 16:
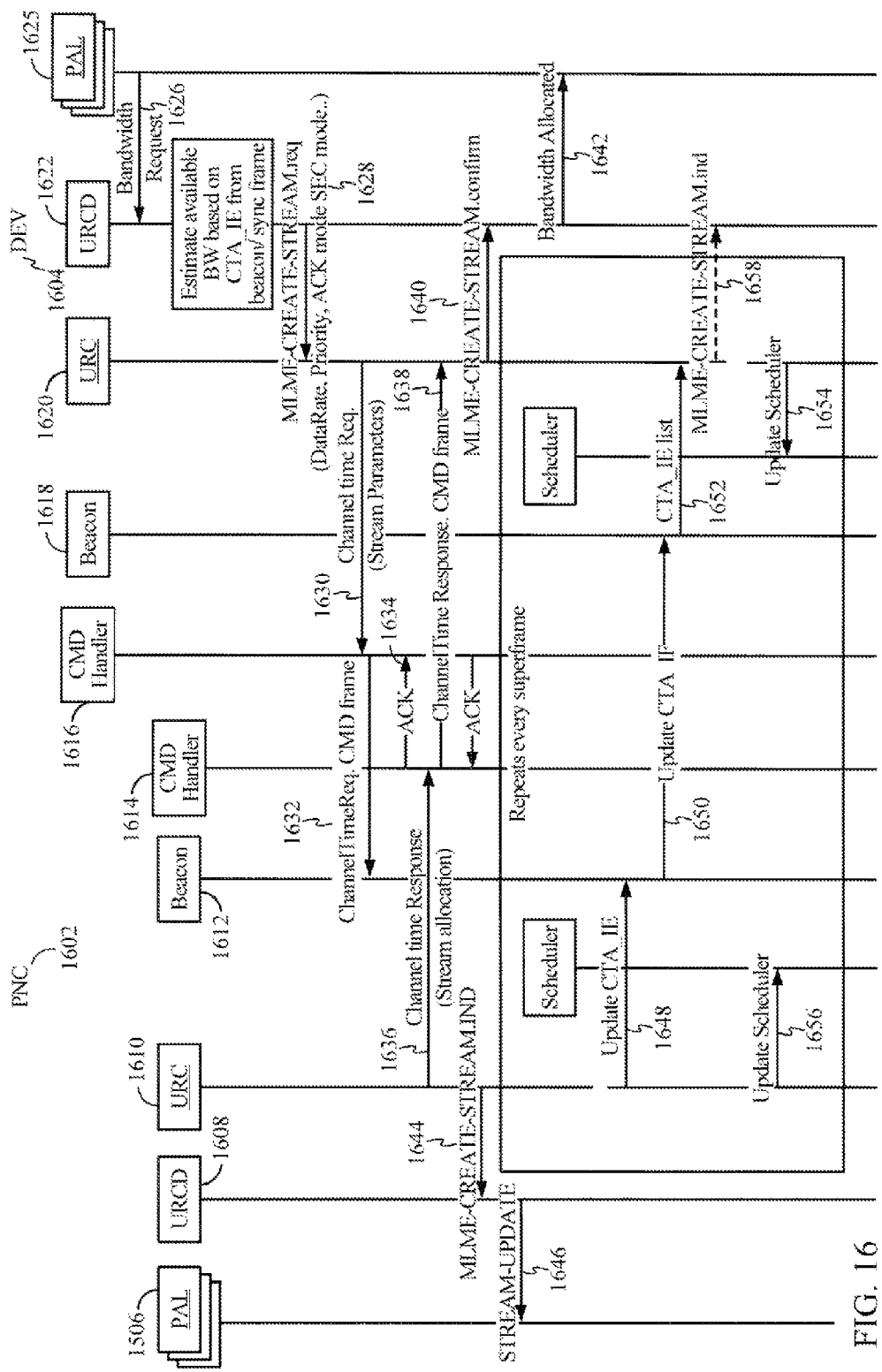
FIG. 16 illustrates an example stream management in accordance with certain aspects of the present disclosure.

The stream management—stream creation (Reservation Flow) is illustrated in FIG. 16. The DEV 1604 PAL 1624 (QoS arbitrator) may request stream bandwidth 1626 and priority. The DEV URCD 1622 may evaluate available bandwidth based on Channel Time Allocations in Beacon/Sync Frame. DEV URCD 1622 may send Create Stream Request message 1628 to the URC 1620. Channel time allocation may be handled by exchanging command frames 1630-1638 between the DEV and the PNC. The PNC URC 1610 sends Create Indication notification to the URCD 1608. Upon completion of the allocation, the DEV. URCD may send "Bandwidth Allocated" message 1642 to the PAL 1624. The PNC URCD 1608 may send " Stream update" 1646 notification to the PAL 1606. For device to device stream, create notification may be handled using CTA_IE 1652 in Beacon/Sync Frame.

The steps 1648-1656 may be performed for every superframe. The PNC URC 1610 may update 1648 the Beacon 1612 block with information about the next CTA IE. The list of CTA IEs 1652 may be forwarded to the DEV URC 1620. the DEV URC may send STREAM-CREATE-Indication 1658 to the URCD 1622 based on CTA_IE in Beacon/Sync Frame. The URC of the PNC and the devices may program the scheduler 1654-1656 with reservation of stream allocations.

Figure 17:
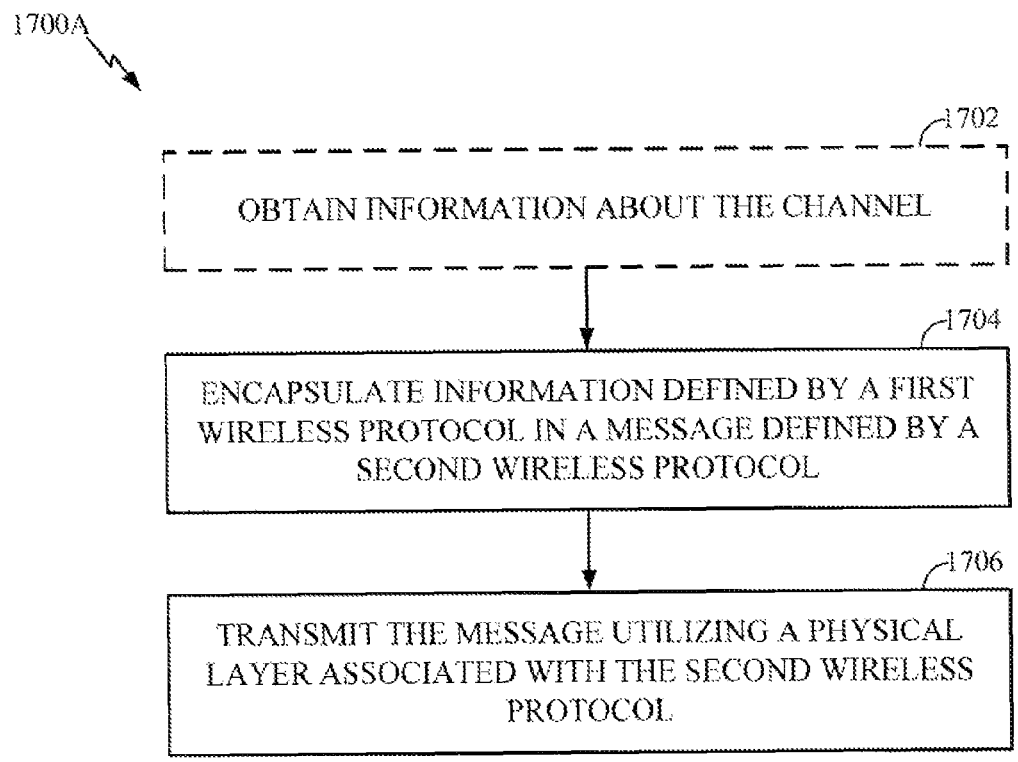
FIG. 17 illustrates example operations for a system utilizing different protocols, in accordance with certain aspects of the present disclosure.
Figure 17A:
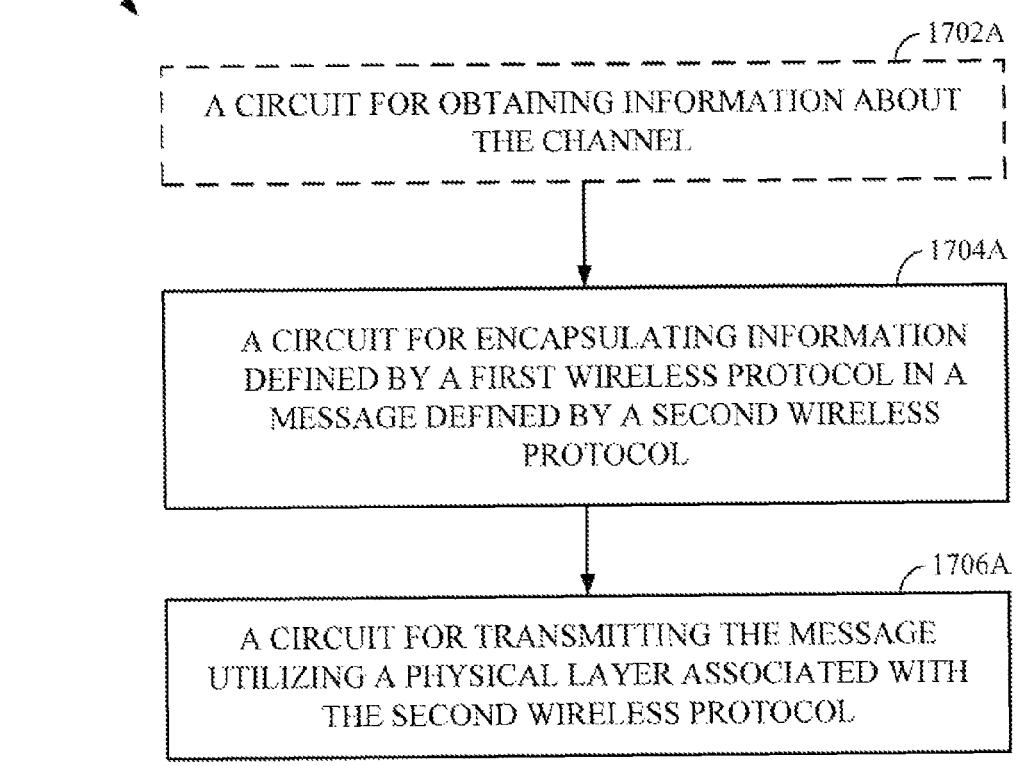

According to certain aspects of the present disclosure, a system may operate in stand-alone mode while operating under two standards as illustrated in FIG. 17. At 1702, after startup, a node (e.g., an access point) may obtain information about the channel. At 1704, the node may encapsulate information defined by a first wireless protocol in a message defined by a second wireless protocol. At 1706, the node may transmit the message utilizing a physical layer associated with the second wireless protocol. As an example, an AP may generate an 802.11 MAC protocol data unit (MPDU), and transmit the MPDU encapsulated in an 802.15.3 frame using an 802.15.3 physical layer.

Figure 9A:
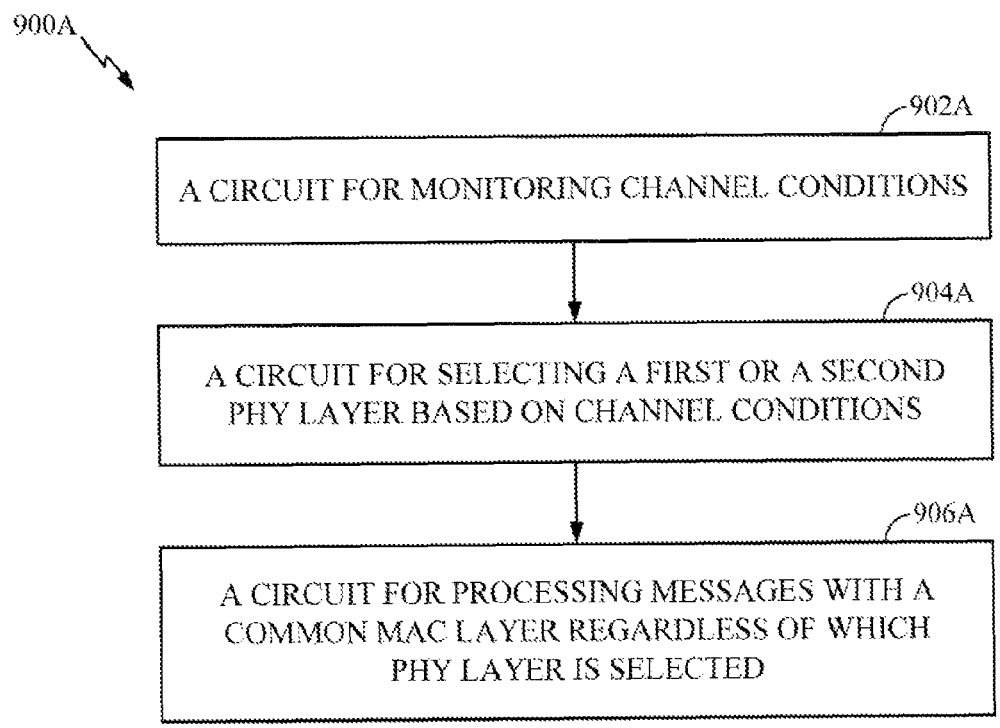
FIG. 9A illustrates example components capable of performing the operations shown in FIG. 9.
Figure 12A:
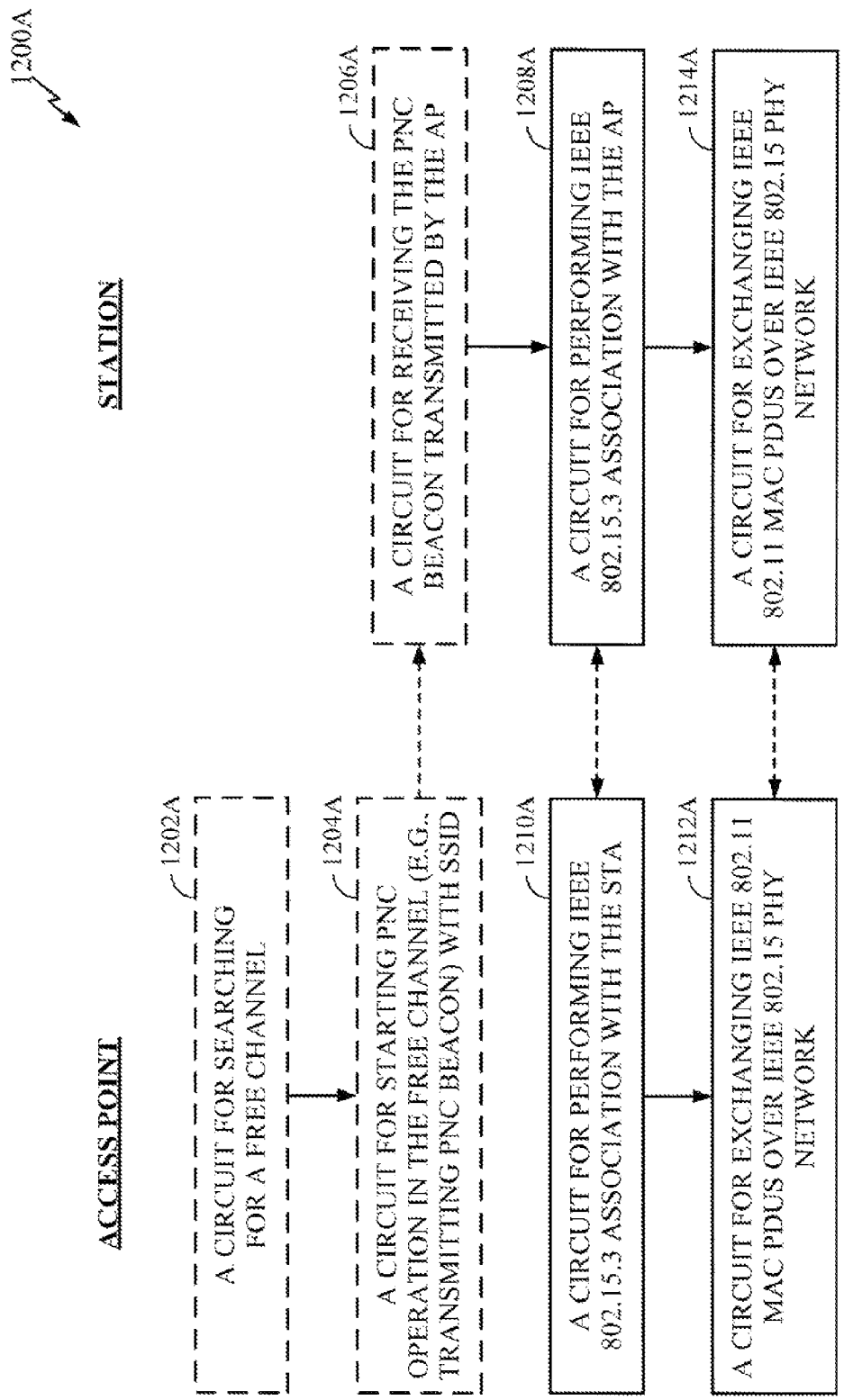
FIG. 12A illustrates example components capable of performing the operations shown in FIG. 12.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, blocks 902-912, illustrated in FIG. 9 correspond to circuit blocks 902A-912A, illustrated in FIG. 9A. In addition, blocks 1202-1216, illustrated in FIG. 12 correspond to circuit blocks 1202A-1216A, illustrated in FIG. 12A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the phrase "at least one of: X and Y" is meant to mean one or both of X and Y. In other words, "at least one of: X and Y" is intended to include X, Y, and a combination of X and Y.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

As used herein, the term "system" generally refers to any suitable combination of hardware, software, and/or firmware, capable of performing corresponding operations described herein. For example, "processing system" generally refers to any suitable combination of hardware, software, and/or firmware capable of performing various processing operations described herein.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that may be known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions may be specified, the order and/or use of specific steps and/or actions may be modified without departing from the scope of the claims.

The functions described may be implemented in hardware, software, firmware or any combination thereof If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software may be transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It may be to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications, comprising:
providing first and second physical layers in an apparatus;
monitoring, by the apparatus, conditions of a wireless communications channel used to communicate with one or more other apparatuses;
selecting, by the apparatus, one of the first and second physical layers for use in communicating with the one or more other apparatuses based, at least in part, on the monitored conditions; and
processing, by the apparatus, messages with a common media access control (MAC) protocol layer regardless of which of the first and second physical layers is selected.

2. The method of claim 1, wherein the first and second physical layers have different corresponding operating frequencies.

3. The method of claim 1, wherein the first physical layer has an operating frequency in a range of 57 to 64 GHz.

4. The method of claim 1, wherein the common MAC protocol layer is defined by at least one of a corresponding family of standards that also defines the second physical layer.

5. The method of claim 1, wherein processing messages with the common MAC protocol layer comprises transforming messages received on the first physical layer into messages compatible with the second physical layer.

6. The method of claim 1, wherein selecting one of the first and second physical layers for use in communicating with the one or more other apparatuses based, at least in part, on the monitored conditions comprises selecting the second physical layer for use in communicating with the one or more other apparatuses based, at least in part, on an error rate measured while communicating with the first physical layer.

7. The method of claim 1, wherein processing messages with a common media access control (MAC) protocol layer regardless of which of the first and second physical layers is selected comprises:
receiving a MAC protocol data unit (MPDU) from the MAC protocol layer; and
fragmenting the MPDU for transmission over the selected physical layer.

8. The method of claim 1, wherein processing messages with a common media access control (MAC) protocol layer regardless of which of the first and second physical layers is selected comprises:
receiving a plurality of MAC protocol data units (MPDUs) from the MAC protocol layer; and
aggregating the MPDUs for transmission over the selected physical layer as a single aggregated MPDU (AMPDU).

9. The method of claim 1, wherein processing messages with a common media access control (MAC) protocol layer regardless of which of the first and second physical layers is selected comprises:
receiving fragments of a MAC Protocol data unit (MPDU) on the selected physical layer;
assembling the fragments to form the MPDU; and
forwarding the assembled MPDU to the MAC protocol layer.

10. The method of claim 1, wherein:
traffic can be switched between the first and second physical layers without changing a state of the MAC protocol layer.

11. The method of claim 1, further comprising:
utilizing security mechanisms of a wireless protocol corresponding to one of the first and second physical layers.

12. The method of claim 1, further comprising:
monitoring acknowledgements with a first state machine if the first physical layer is selected; and
monitoring acknowledgements with a second state machine if the second physical layer is selected.

13. The method of claim 1, further comprising:
supporting at least two modes of aggregation for exchanging data units.

14. The method of claim 13, wherein the at least two modes of aggregation comprise:
a first aggregation mode having a corresponding first maximum subframe size; and
a second aggregation mode having a corresponding second maximum subframe size.

15. The method of claim 13, further comprising:
sharing a sequence number between the first and second physical layers if in a first aggregation mode.

16. The method of claim 15, wherein sharing a sequence number between the first and second physical layers if in the first aggregation mode comprises:
mapping a first sequence number associated with a first wireless protocol to a second sequence number associated with a second wireless protocol.

17. The method of claim 15, wherein sharing a sequence number between the first and second physical layers if in the first aggregation mode comprises:
generating a first sequence number associated with a first wireless protocol based on a subset of bits of a second sequence number associated with a second wireless protocol.

18. An apparatus for wireless communications, comprising:
a first physical layer;
a second physical layer;
a monitoring system configured to monitor conditions of a wireless communications channel used to communicate with one or more other apparatuses;
a selecting system configured to select one of the first and second physical layers for use in communicating with the one or more other apparatuses based, at least in part, on the monitored conditions; and
a processing system configured to process messages with a common media access control (MAC) protocol layer regardless of which of the first and second physical layers is selected.

19. The apparatus of claim 18, wherein the first and second physical layers have different corresponding operating frequencies.

20. The apparatus of claim 18, wherein the first physical layer has an operating frequency in a range of 57 to 64 GHz.

21. The apparatus of claim 18, wherein the common MAC protocol layer is defined by at least one of a corresponding family of standards that also defines the second physical layer.

22. The apparatus of claim 18, wherein the processing system is configured to process messages with the common MAC protocol layer by transforming messages received on the first physical layer into messages compatible with the second physical layer.

23. The apparatus of claim 18, wherein the selecting system is configured to select the second physical layer for use in communicating with the one or more other apparatuses if the monitored conditions are more suitable for using the second physical layer.

24. The apparatus of claim 23, wherein the selecting system is configured to determine the monitored conditions are more suitable for using the second physical layer based on an error rate measured while communicating with the first physical layer.

25. The apparatus of claim 18, wherein the processing system is configured to:
receive a multi-protocol data unit (MPDU) from the MAC protocol layer; and
fragment the MPDU for transmission over the selected physical layer.

26. The apparatus of claim 18, wherein the processing system is configured to:
receive fragments of a multi-protocol data unit (MPDU) on the selected physical layer;
assemble the fragments to form the MPDU; and
forward the assembled MPDU to the MAC protocol layer.

27. The apparatus of claim 18, wherein the selecting system is configured to switch traffic between the first and second physical layers without changing a state of the MAC protocol layer.

28. The apparatus of claim 18, wherein the processing system is configured to utilize security mechanisms of a wireless protocol corresponding to one of the first and second physical layers.

29. The apparatus of claim 18, wherein the processing system is configured to:
monitor acknowledgements with a first state machine if the first physical layer is selected; and
monitor acknowledgements with a second state machine if the second physical layer is selected.

30. The apparatus of claim 18, wherein the processing system is configured to support at least two modes of aggregation for exchanging data units.

31. The apparatus of claim 30, wherein the at least two modes of aggregation comprise:
a first aggregation mode having a corresponding first maximum subframe size; and
a second aggregation mode having a corresponding second maximum subframe size.

32. The apparatus of claim 30, wherein the processing system is configured to share a sequence number between the first and second physical layers if in a first aggregation mode.

33. The apparatus of claim 32, wherein the processing system is configured to share a sequence number between the first and second physical layers by:
mapping a first sequence number associated with a first wireless protocol to a second sequence number associated with a second wireless protocol.

34. The apparatus of claim 32, wherein the processing system is configured to share a sequence number between the first and second physical layers by:
generating a first sequence number associated with a first wireless protocol based on a subset of bits of a second sequence number associated with a second wireless protocol.

35. An apparatus for wireless communications, comprising:
a first physical layer;
a second physical layer;
means for monitoring conditions of a wireless communications channel used to communicate with one or more other apparatuses;
means for selecting one of the first and second physical layers for use in communicating with the one or more other apparatuses based, at least in part, on the monitored conditions; and
means for processing messages with a common media access control (MAC) protocol layer regardless of which of the first and second physical layers is selected.

36. The apparatus of claim 35, wherein the first and second physical layers have different corresponding operating frequencies.

37. The apparatus of claim 35, wherein the first physical layer has an operating frequency in a range of 57 to 64 GHz.

38. The apparatus of claim 35, wherein the common MAC protocol layer is defined by at least one of a corresponding family of standards that also defines the second physical layer.

39. The apparatus of claim 35, wherein the means for processing is configured to process messages with the common MAC protocol layer by transforming messages received on the first physical layer into messages compatible with the second physical layer.

40. The apparatus of claim 35, wherein the means for selecting is configured to select the second physical layer for use in communicating with the one or more other apparatuses if the monitored conditions are more suitable for using the second physical layer.

41. The apparatus of claim 40, wherein the means for selecting is configured to determine the monitored conditions are more suitable for using the second physical layer based on an error rate measured while communicating with the first physical layer.

42. The apparatus of claim 35, wherein the means for processing is configured to:
receive a multi-protocol data unit (MPDU) from the MAC protocol layer; and
fragment the MPDU for transmission over the selected physical layer.

43. The apparatus of claim 35, wherein the means for processing is configured to:
receive fragments of a multi-protocol data unit (MPDU) on the selected physical layer;
assemble the fragments to form the MPDU; and
forward the assembled MPDU to the MAC protocol layer.

44. The apparatus of claim 35, wherein the means for selecting is configured to switch traffic between the first and second physical layers without changing a state of the MAC protocol layer.

45. The apparatus of claim 35, wherein the means for processing is configured to utilize security mechanisms of a wireless protocol corresponding to one of the first and second physical layers.

46. The apparatus of claim 35, wherein the means for processing is configured to:
monitor acknowledgements with a first state machine if the first physical layer is selected; and
monitor acknowledgements with a second state machine if the second physical layer is selected.

47. The apparatus of claim 35, wherein the means for processing is configured to support at least two modes of aggregation for exchanging data units.

48. The apparatus of claim 47, wherein the at least two modes of aggregation comprise:

a first aggregation mode having a corresponding first maximum subframe size; and a second aggregation mode having a corresponding second maximum subframe size.

49. The apparatus of claim 47, wherein the means for processing is configured to share a sequence number between the first and second physical layers if in a first aggregation mode.

50. The apparatus of claim 49, wherein the means for processing is configured to share a sequence number between the first and second physical layers by:

mapping a first sequence number associated with a first wireless protocol to a second sequence number associated with a second wireless protocol.

51. The apparatus of claim 49, wherein the means for processing is configured to share a sequence number between the first and second physical layers by:

generating a first sequence number associated with a first wireless protocol based on a subset of bits of a second sequence number associated with a second wireless protocol.

52. A wireless apparatus, comprising:

at least one antenna;

a first physical layer;

a second physical layer;

a monitoring system configured to monitor conditions of a wireless communications channel used to communicate with one or more other apparatuses, via the at least one antenna;

a selecting system configured to select one of the first and second physical layers for use in communicating with the one or more other apparatuses based, at least in part, on the monitored conditions; and a processing system configured to process messages with a common media access control (MAC) protocol layer regardless of which of the first and second physical layers is selected.

53. A computer-program product for wireless communications, comprising a non-transitory computer-readable medium encoded with instructions executable to:

monitor, by an apparatus having first and second physical layers, conditions of a wireless communications channel used to communicate with one or more other apparatuses;

select, by the apparatus, one of the first and second physical layers for use in communicating with the one or more other apparatuses based, at least in part, on the monitored conditions; and process, by the apparatus, messages with a common media access control (MAC) protocol layer regardless of which of the first and second physical layers is selected.

* * * * *